US010291634B2

(12) United States Patent
Arzi et al.

(10) Patent No.: US 10,291,634 B2
(45) Date of Patent: May 14, 2019

(54) SYSTEM AND METHOD FOR DETERMINING SUMMARY EVENTS OF AN ATTACK

(71) Applicant: CHECKPOINT SOFTWARE TECHNOLOGIES LTD., Tel Aviv (IL)

(72) Inventors: Lior Arzi, Givatayim (IL); Anandabrata Pal, Rehovot (IL); Tamara Leiderfarb, Modi'in (IL)

(73) Assignee: CHECKPOINT SOFTWARE TECHNOLOGIES LTD., Tel Aviv (IL)

( * ) Notice: Subject to any disclaimer, the term of this patent is extended or adjusted under 35 U.S.C. 154(b) by 313 days.

(21) Appl. No.: 15/372,423

(22) Filed: Dec. 8, 2016

(65) Prior Publication Data

US 2017/0171229 A1 Jun. 15, 2017

Related U.S. Application Data

(63) Continuation-in-part of application No. 14/963,267, filed on Dec. 9, 2015.

(60) Provisional application No. 62/264,891, filed on Dec. 9, 2015.

(51) Int. Cl.
*H04L 29/06* (2006.01)

(52) U.S. Cl.
CPC ................................ *H04L 63/1416* (2013.01)

(58) Field of Classification Search
CPC ............. H04L 63/1416; H04L 63/1425; H04L 63/1433; H04L 63/1441; H04L 63/145; H04L 63/20; G06F 21/566
See application file for complete search history.

(56) References Cited

U.S. PATENT DOCUMENTS

| | | | | |
|---|---|---|---|---|
| 7,870,610 | B1 | 1/2011 | Mitchell | |
| 7,958,560 | B1 | 6/2011 | Guruswamy | |
| 8,464,346 | B2 | 6/2013 | Barai | |
| 8,547,974 | B1 | 10/2013 | Guruswamy | |
| 8,601,587 | B1 | 12/2013 | Powell | |
| 8,813,234 | B1 | 8/2014 | Bowers | |
| 8,881,282 | B1 | 11/2014 | Aziz | |
| 9,098,333 | B1 | 8/2015 | Obrecht | |
| 9,124,622 | B1 | 9/2015 | Falkowitz et al. | |
| 9,330,259 | B2 | 5/2016 | Klein et al. | |
| 9,344,444 | B2 | 5/2016 | Lippmann | |
| 9,378,367 | B2 | 6/2016 | Pereira | |
| 9,537,884 | B1 | 1/2017 | Raugas | |
| 2002/0032717 | A1 | 3/2002 | Malan | |
| 2005/0138413 | A1 * | 6/2005 | Lippmann ............. | G06F 21/577 726/4 |
| 2006/0021034 | A1 | 1/2006 | Cook | |
| 2006/0021044 | A1 | 1/2006 | Cook | |

(Continued)

OTHER PUBLICATIONS

Shandilya et al., "Use of Attack Graphs in Secutiry Systems", Journal of Computer Networks and Communications, Oct. 2014.

(Continued)

*Primary Examiner* — Brian F Shaw
(74) *Attorney, Agent, or Firm* — Mark M. Friedman

(57) ABSTRACT

Computerized methods and systems determine summary events from an attack on an endpoint. The detection and determination of these summary events is performed by a machine, e.g., a computer, node of a network, system or the like.

15 Claims, 14 Drawing Sheets

(56) References Cited

U.S. PATENT DOCUMENTS

| | | | |
|---|---|---|---|
| 2006/0021045 | A1 | 1/2006 | Cook |
| 2006/0021046 | A1 | 1/2006 | Cook |
| 2006/0021047 | A1 | 1/2006 | Cook |
| 2006/0021048 | A1 | 1/2006 | Cook |
| 2006/0021049 | A1 | 1/2006 | Cook |
| 2006/0021050 | A1 | 1/2006 | Cook |
| 2006/0085858 | A1 | 4/2006 | Noel |
| 2006/0253906 | A1 | 11/2006 | Rubin |
| 2007/0067843 | A1 | 3/2007 | Williamson et al. |
| 2008/0005782 | A1 | 1/2008 | Aziz |
| 2008/0127292 | A1 | 5/2008 | Cooper |
| 2008/0141371 | A1 | 6/2008 | Bradicich |
| 2008/0222215 | A1 | 9/2008 | Bai |
| 2009/0044024 | A1 | 2/2009 | Oberheide |
| 2009/0271863 | A1 | 10/2009 | Govindavajhala |
| 2010/0024036 | A1 | 1/2010 | Morozov |
| 2010/0031358 | A1* | 2/2010 | Elovici ................ H04L 41/147 726/24 |
| 2011/0030045 | A1 | 2/2011 | Beauregard |
| 2013/0042294 | A1 | 2/2013 | Colvin et al. |
| 2013/0160128 | A1 | 6/2013 | Dolan-Gavitt |
| 2013/0167236 | A1 | 6/2013 | Sick |
| 2013/0254494 | A1 | 9/2013 | Oxford |
| 2014/0237590 | A1 | 8/2014 | Shua et al. |
| 2014/0289851 | A1 | 9/2014 | Klein et al. |
| 2015/0033346 | A1 | 1/2015 | Hebert |
| 2015/0172302 | A1 | 6/2015 | Conlon |
| 2015/0199512 | A1 | 7/2015 | Kim |
| 2015/0264062 | A1 | 9/2015 | Hagiwara et al. |
| 2015/0269383 | A1 | 9/2015 | Lang |
| 2015/0278518 | A1 | 10/2015 | Pereira |
| 2015/0371043 | A1 | 12/2015 | Bejerasco et al. |
| 2015/0373036 | A1 | 12/2015 | Patne |
| 2015/0381649 | A1* | 12/2015 | Schultz ............... H04L 63/1433 726/25 |
| 2016/0072844 | A1 | 3/2016 | Porras |
| 2016/0099963 | A1 | 4/2016 | Mahaffey |
| 2016/0162690 | A1 | 6/2016 | Reith |
| 2016/0188878 | A1 | 6/2016 | Kulkarni et al. |
| 2016/0285894 | A1* | 9/2016 | Nelms .................. H04L 63/145 |
| 2016/0366167 | A1 | 12/2016 | Yumer |
| 2016/0381043 | A1 | 12/2016 | Yamada |
| 2017/0019421 | A1 | 1/2017 | Hebert |
| 2017/0109189 | A1 | 4/2017 | Swidowski |
| 2017/0126741 | A1 | 5/2017 | Lang |
| 2017/0163666 | A1 | 6/2017 | Venkatramani |

OTHER PUBLICATIONS

Angelini et al., Percival: Proactive and Reactive Attack and Response Assessment of Cyber Incidents Using Visual Analytics, 2015, IEEE.
Buldas et al., "New Efficient Utility Upper Bounds for the Fully Adaptive Model of Attack Trees", Springer, 2013.
Kotenko et al., "A Cyber Attack Modeling and Impact Assessment Framework", 2013, NATO CCD COE Publications.

* cited by examiner

| | TIME | SUBEVENT | SUMMARY EVENT (SE) |
|---|---|---|---|
| URL | | | |
| CNN.com | t | HTTP POST (HP) | YES |
| CNN.com | t + 1 | HTTP GET (HG) | YES |
| CNN.com | t + 2 | HP | NO |
| ABC.com | t + 3 | HG | YES |
| IP | | | |
| 121.9.8.8 | t | SEND | YES |
| 121.9.8.8 | t + 1 | RECEIVE (RCV) | YES |
| 121.9.8.8 | t + 2 | SEND | NO |

FIG. 6C-2

| PROCESS | EVENT | PATH | TIME | SUMMARY EVENT (SE) |
|---|---|---|---|---|
| R | C (Create) | C:\LOL.TXT | t | YES |
| R | M (Modify) | C:\LOL.TXT | t + 1 | YES |
| R | M | C:\LOL.TXT | t + 2 | NO |
| R | M | C:\LOL.TXT | t + 3 | NO |
| R | D (Delete) | C:\LOL.TXT | t + 4 | YES |
| R | C | C:\S.TXT | t + 5 | YES |

FIG. 6D-2

SYSTEM AND METHOD FOR DETERMINING SUMMARY EVENTS OF AN ATTACK

CROSS REFERENCES TO RELATED APPLICATIONS

This application is a continuation in part of commonly owned U.S. patent application Ser. No. 14/963,267, entitled: Method And System For Modeling All Operations And Executions Of An Attack And Malicious Process Entry, filed on Dec. 9, 2015, and, this application is related to and claims priority from commonly owned U.S. Provisional Patent Application Ser. No. 62/264,891, entitled: Method and System for Identifying Summary Events, filed on Dec. 9, 2015. The disclosures of the aforementioned patent applications are incorporated by reference in their entirety herein.

TECHNICAL FIELD

The present invention relates to methods and systems for detecting cyber-attacks, and in particular to analyzing the events of the cyber-attack, which occur at endpoints.

BACKGROUND OF THE INVENTION

Malware is any software used to disrupt computer operations, gather sensitive information, or gain access to private assets residing in computer systems. This can lead to the malware creator or other unauthorized parties gaining access to the computer system and private information stored on the computer system being compromised. Malware includes computer viruses, worms, trojan horses, spyware, adware, key loggers, and other malicious programs. These programs can appear in the form of computerized code, scripts, and other software.

Software, such as, for example, anti-virus, anti-spyware, anti-malware and firewalls, are depended upon by computer users for protecting against malware and other malicious attacks. These types of protective software also help to identify malware attacks and take protective actions in response to identification of a malware attack.

SUMMARY OF THE INVENTION

The present invention provides computerized methods and systems which analyze voluminous amounts of data, and identify operations of the data which are directly attributable to cyber-attacks, such as those caused by malware.

The present invention is directed to computerized methods and systems, which analyze cyber-attacks, such as those from malware, on an endpoint, such as a machine, e.g., a computer, node of a network, system or the like, based on events of the attack, to allow for providing a summarized form of the attack, in multiple types of views, both textual and graphical.

The present invention also provides methods and systems which utilize the attack trees, which show the attack on the end point and the damage caused by the attack, as it propagates through the machine, network, system, or the like, and the events associated therewith, to provide a summary of the most relevant events of the attack, in order to draw attention to these events. By looking at certain events, known as "summary events" of the cyber-attack on the endpoint, correlations between events that are associated with the attack and how such events are connected or otherwise associated with each other, are determined.

Embodiments of the invention are directed to a method for determining summary events for an attack on an endpoint. The method comprises: obtaining an attack tree corresponding to the attack, the attack tree comprising events; and, identifying summary events from the events of the attack tree, each summary event being unique from every other summary event.

Optionally, the summary events include at least one of damage and suspicious events.

Optionally, the summary events include at least one of: network events, File Create/Delete/Modify/Rename/Copy events, Hook or Code injections, registry modification events, and other predefined events.

Optionally, the network events include first impressions of at least one of a destination Uniform Resource Locator (URL) and Internet Protocol (IP).

Optionally, the File Create/Delete/Modify/Rename/Copy events include a first instance of at least one of: a File Create/Delete/Modify/Rename/Copy event, a digital link library (DLL) file, and a file associated with a payload process.

Optionally, the end point includes at least one of a machine, including a computer, node of a network or system.

Other embodiments are directed to a computer usable non-transitory storage medium having a computer program embodied thereon for causing a suitable programmed system to determine summary events for an attack on an endpoint, by performing the following steps when such program is executed on the system. The steps comprise: obtaining an attack tree corresponding to the attack, the attack tree comprising events; and, identifying summary events from the events of the attack tree, each summary event being unique from every other summary event.

Optionally, the computer usable non-transitory storage medium is such that the summary events include at least one of damage and suspicious events.

Optionally, the computer usable non-transitory storage medium is such that the summary events include at least one of: network events, File Create/Delete/Modify/Rename/Copy events, Hook or Code injections, registry modification events, and other predefined events.

Optionally, the computer usable non-transitory storage medium is such that the network events include first impressions of at least one of a destination Uniform. Resource Locator (URL) and Internet Protocol (IP).

Optionally, the computer usable non-transitory storage medium is such that the File Create/Delete/Modify/Rename/Copy events include a first instance of at least one of: a File Create/Delete/Modify/Rename/Copy event, a digital link library (DLL) file, and a file associated with a payload process.

Optionally, the computer usable non-transitory storage medium is such that the network events include first impressions.

Optionally, the computer usable non-transitory storage medium is such that the end point includes at least one of a machine, including a computer, node of a network or system.

Other embodiments are directed to a computer system for determining summary events for an attack on an endpoint. The computer system comprises: a storage medium for storing computer components and a computerized processor for executing the computer components. The computer components comprise: a module configured for obtaining an attack tree corresponding to the attack, the attack tree comprising events; and, a module configured for identifying summary events from the events of the attack tree, each summary event being unique from every other summary event.

Optionally, the module configured for identifying summary events is configured for identifying at least one of damage and suspicious events as summary events.

Optionally, the module configured for identifying summary events is configured for identifying at least one of: network events, File Create/Delete/Modify/Rename/Copy events, Hook or Code injections, registry modification events, and other predefined events, as summary events.

This document references terms that are used consistently or interchangeably herein. These terms, including variations thereof, are as follows:

A "computer" includes machines, computers and computing or computer systems (for example, physically separate locations or devices), servers, computer and computerized devices, processors, processing systems, computing cores (for example, shared devices), and similar systems, workstations, modules and combinations of the aforementioned. The aforementioned "computer" may be in various types, such as a personal computer (e.g., laptop, desktop, tablet computer), or any type of computing device, including mobile devices that can be readily transported from one location to another location (e.g., smartphone, personal digital assistant (PDA), mobile telephone or cellular telephone).

A "process", also referred to herein as an "application process", refers to an instance of a computer program that is being executed (e.g., executable file). While a computer program is a passive collection of instructions; a process (application process) is the actual execution of those instructions. Each process provides the resources necessary to execute the program file. A process includes, for example, an image of the executable machine code associated with a program, memory (typically some region of virtual memory); which includes the executable code, process-specific data (input and output), a call stack (to keep track of active subroutines and/or other events), and a heap to hold intermediate computation data generated during run time, operating system descriptors of resources that are allocated to the process (application process), such as handles (Windows), Security attributes, such as the process owner and the process' (application process') set of permissions (allowable operations), a unique identifier etc. A non-exhaustive list of examples of processes (application processes) includes:

- processes (application processes) that are instances/executions of compression applications (application process), such as, for example, zip applications, rar applications and the like;
- processes (application processes) are instances/executions of network applications (application processes), such as, for example, email clients, web browsers (e.g. chrome, firefox, etc.), and FTP (file transfer protocol) clients;
- processes (application processes) that are instances/executions of payload applications (application processes), such as, for example, Microsoft® Office applications and Adobe® PDF Reader®;
- processes (application processes) that are instances/executions of executables written and maintained by the creators of the operating system (OS) (i.e., Microsoft) and packaged on the computer as part of the operating system, such as, for example, services.exe and explorer.exe.

A "payload application" refers to an application process that is generally considered to be benign but that can be used for malicious intent if used to execute a malicious file. A non-exhaustive list of examples of payload application processes includes:

- Microsoft® Office applications (e.g. Microsoft® Word, Microsoft® Excel, Microsoft® Project, etc.);
- Adobe® PDF Reader®.

A "compression/installer (install helper) application (application process)" refers to an application that is primarily purposed to reduce the size of a file and combine multiple files into a single file in order to facilitate easier storage, transmission and distribution. Compression applications (application processes) are generally considered to be benign but can be used for malicious intent if used to extract a malicious file. A non-exhaustive list of examples of compression applications includes:

- Zip applications;
- RAR applications;
- 7z applications;
- MISEXEC.

A "network application" refers to an application (application process) that is primarily purposed to initiate and maintain a connection between the computer running the network application and other computers on a network or over the Internet. A non-exhaustive list of examples of network applications includes:

- email clients;
- web browsers (e.g., chrome, firefox, etc.);
- FTP clients.

The terms "click", "clicks", "click on", "clicks on", "activates", and "activation", involves the activation of a computer pointing apparatus, such as a device commonly known as a mouse, or a touch, swipe, contact, or the like on a touch screen, on a location on a computer screen display, including screen displays of tablets and mobile telephones, to cause the computer to take actions, such as opening emails and attachments, beginning file downloads, and the like.

A uniform resource locator (URL) is the unique address for a file, such as a web site or a web page, that is accessible over Networks including the Internet.

An Internet Protocol address (IP address) is a numerical label assigned to each device (e.g., computer, printer) participating in a computer network that uses the Internet Protocol for communication. An IP address serves two principal functions: host or network interface identification and location addressing. Its role has been characterized as follows: "A name indicates what we seek. An address indicates where it is."

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings:

FIGS. 3B-1 and 3B-2 are a diagram of an example of a malicious attack;

FIG. 6C-1 is a flow diagram detailing the process of determining certain network events as summary events from the flow diagram of FIG. 6B;

FIG. 6C-2 is a diagram listing example destination URLs and destination IPs;

FIG. 6D-1 is a flow diagram detailing the process of determining certain Create/Modify/Delete/Read/Copy events as summary events from the flow diagram of FIG. 6B; and, FIG. 6D-2 is a diagram listing processes, events and paths, used in explaining first instances of events, in FIG. 6D-1.

DETAILED DESCRIPTION

Figure 1:
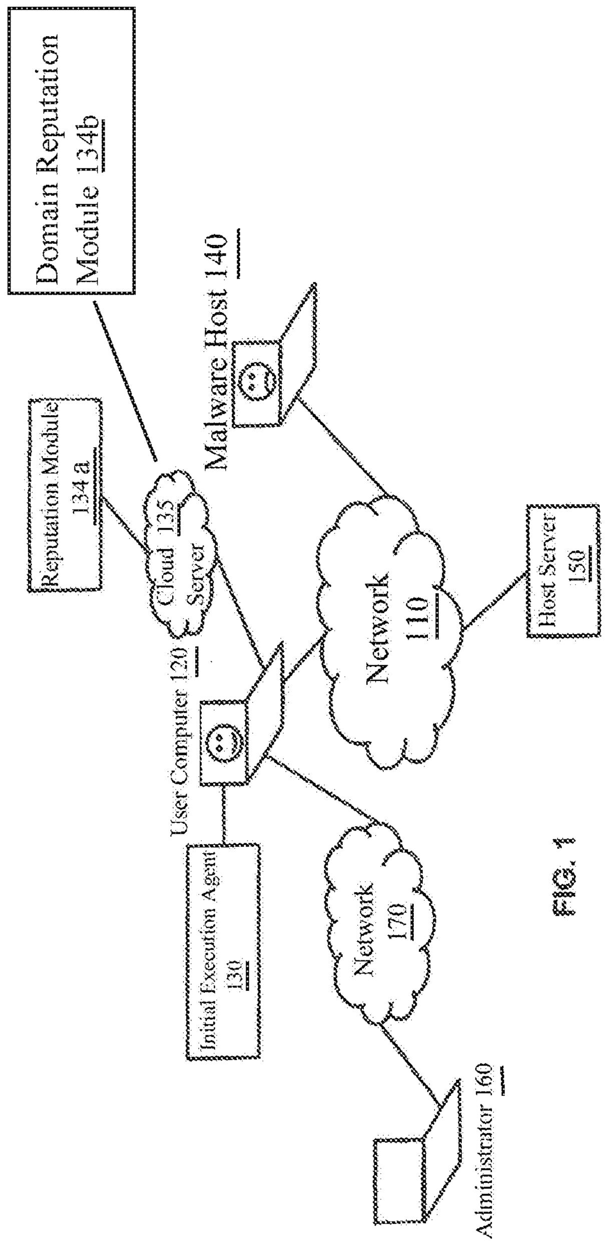
FIG. 1 is a diagram illustrating a system environment in which an embodiment of the invention is deployed.

The present invention is directed to computerized methods and systems, which determine the summary events of an attack on an endpoint, such as a machine, e.g., an endpoint client computer, system, node of a network, or the like. An agent installed on an endpoint client monitors activity on the endpoint client computer, machine, system, network, or the like. With an attack having been detected by suspicious or malicious activity of a process, either by the agent or a similar agent, the agent traces the process tied to the suspicious or malicious activity to the entry point of the suspicious or malicious process by executing a sequence of processes. As a result, the agent is able to identify the events of the processes of the attack, which was initiated at the endpoint. The agent also utilizes the attack execution/attack or start root, to run a tree traversal algorithm, in order to obtain the events of the processes and determine whether these events are summary events, which are typically recognized, stored, and organized into multiple views, such as textual and graphical.

In the context of this document, the term “data object” generally refers to files, registry keys, network operations, file modifications, registry entries, injections, mutexes, pipes, hooks, and application arguments.

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways.

Throughout this document, references are made to trademarks, and domain names. These trademarks and domain names are the property of their respective owners, and are referenced only for explanation purposes herein.

FIG. 1 shows an example environment in which embodiments of the present disclosure are performed over a network 110. The network 110 may be formed of one or more networks, including, for example, the Internet, cellular networks, wide area, public, and local networks. The embodiments include a system 120' (FIG. 2), including, for example, an agent 130, on an endpoint client, for example, a user computer 120 (linked to the network 110). The agent 130 determines the initial execution of an attack (i.e., malware attack) on the user computer 120. Based on this initial execution of an attack, the entry point of the attack can be determined (by the entry point determination module 138) and the attack can be modeled, for example, in the form of an attack tree, by the attack modeling module 139, as shown in FIG. 2.

In a non-limiting example, a malware host 140, also linked to the network 110, creates a malicious file that when executed calls a process that may be a malicious process or a benign process. The malicious file is made available to the host server 150 by the malware host 140. The host server 150 is linked to the network 110 and represents numerous servers hosting, for example, web sites, accessible through web servers (not shown). The malicious file enters the user computer 120 via the access of the host server 150 by the user computer 120.

The agent 130 includes software, software routines, code, code segments and the like, embodied, for example, in computer components, modules and the like, that are installed on machines, such as the user computer 120. For example, the agent 130 performs an action when a specified event occurs, as will be further detailed below. The agent 130 may be instructed to perform such actions by an administrator 160. The administrator may be a computer separate from the user computer 120 linked to the user computer 120 via a private network 170 such as an Intranet. Alternatively, the administrator 160 may be linked to the user computer 120 via the network 110.

Figure 2:
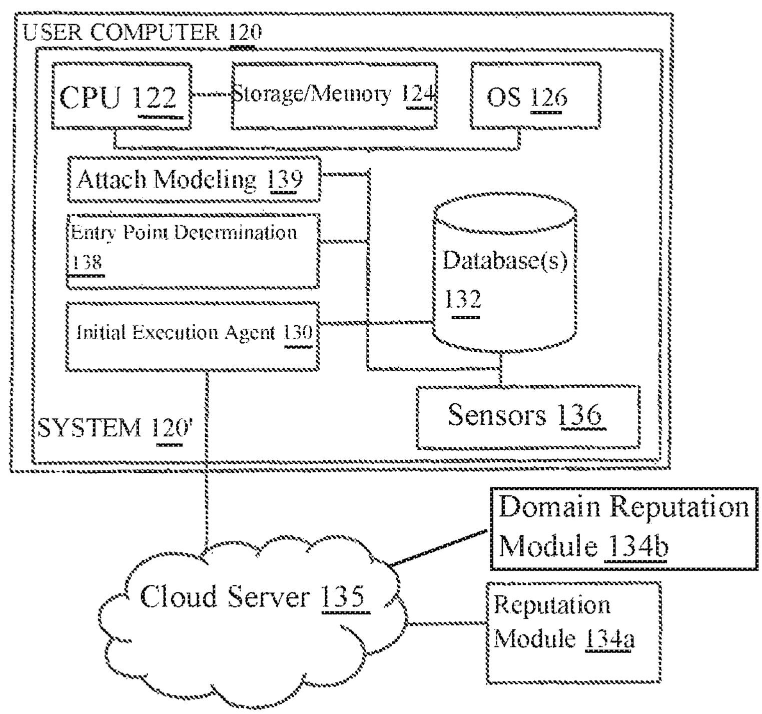
FIG. 2 is a diagram of the architecture of an exemplary system embodying the invention.

FIG. 2 shows the user computer 120 and the system 120' therein, as an architecture, with the agent 130 incorporated into the system 120' of the user computer 120. The system 120' is referred to as “the system” in the descriptions of FIGS. 3A, 3B-1, 3B-2, 4, 5A and 5B below. All components of the user computer 120 and/or system 120' are connected or linked to each other (electronically and/or data), either directly or indirectly.

Initially, the user computer 120 (and system 120') includes a central processing unit (CPU) 122, a storage/memory 124, and an operating system (OS) 126. The processors of the CPU 122 and the storage/memory 124, although shown as a single component for representative purposes, may be multiple components.

Figure 4:
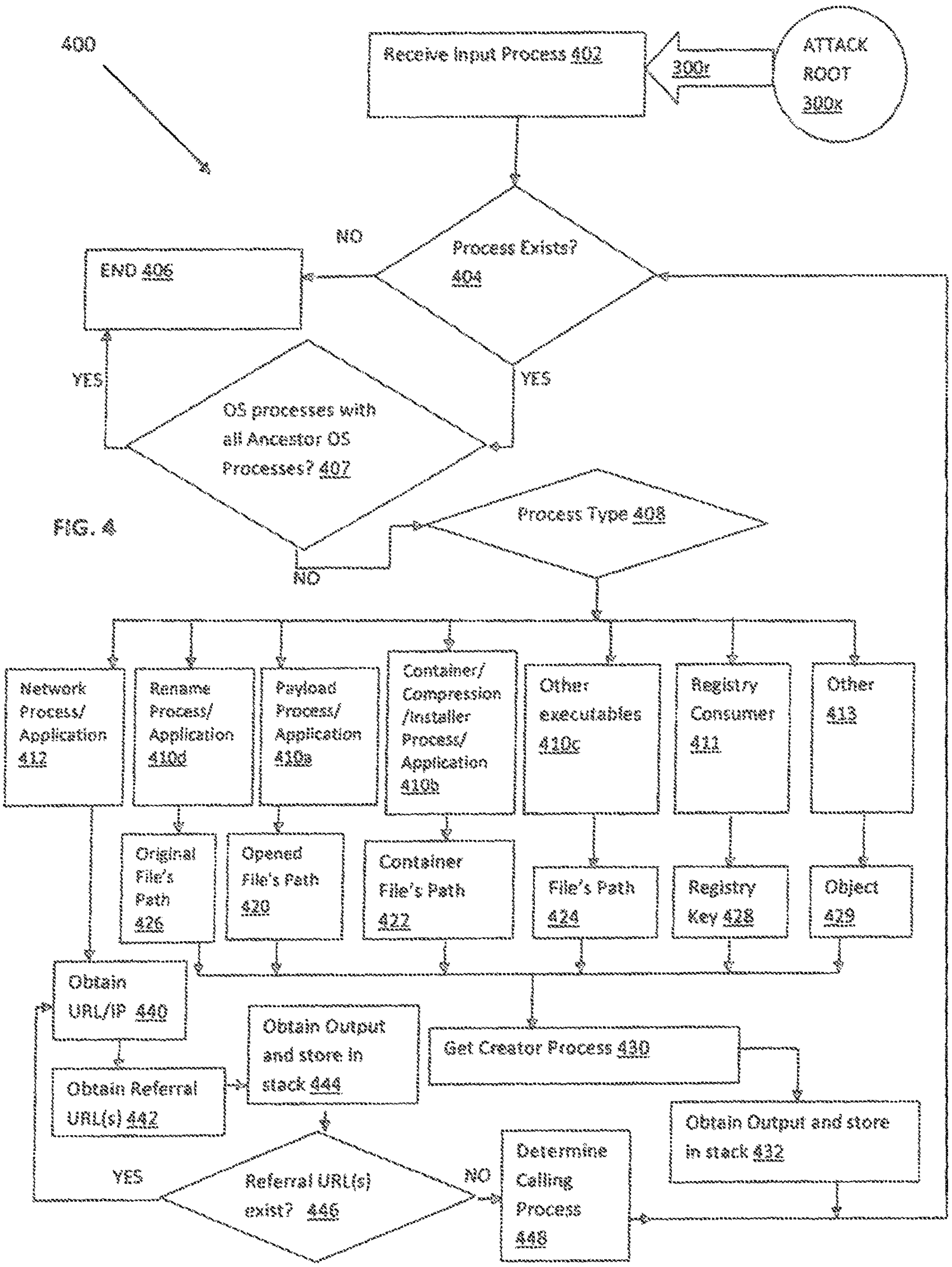
FIG. 4 is a diagram of events.
Figure 5A:
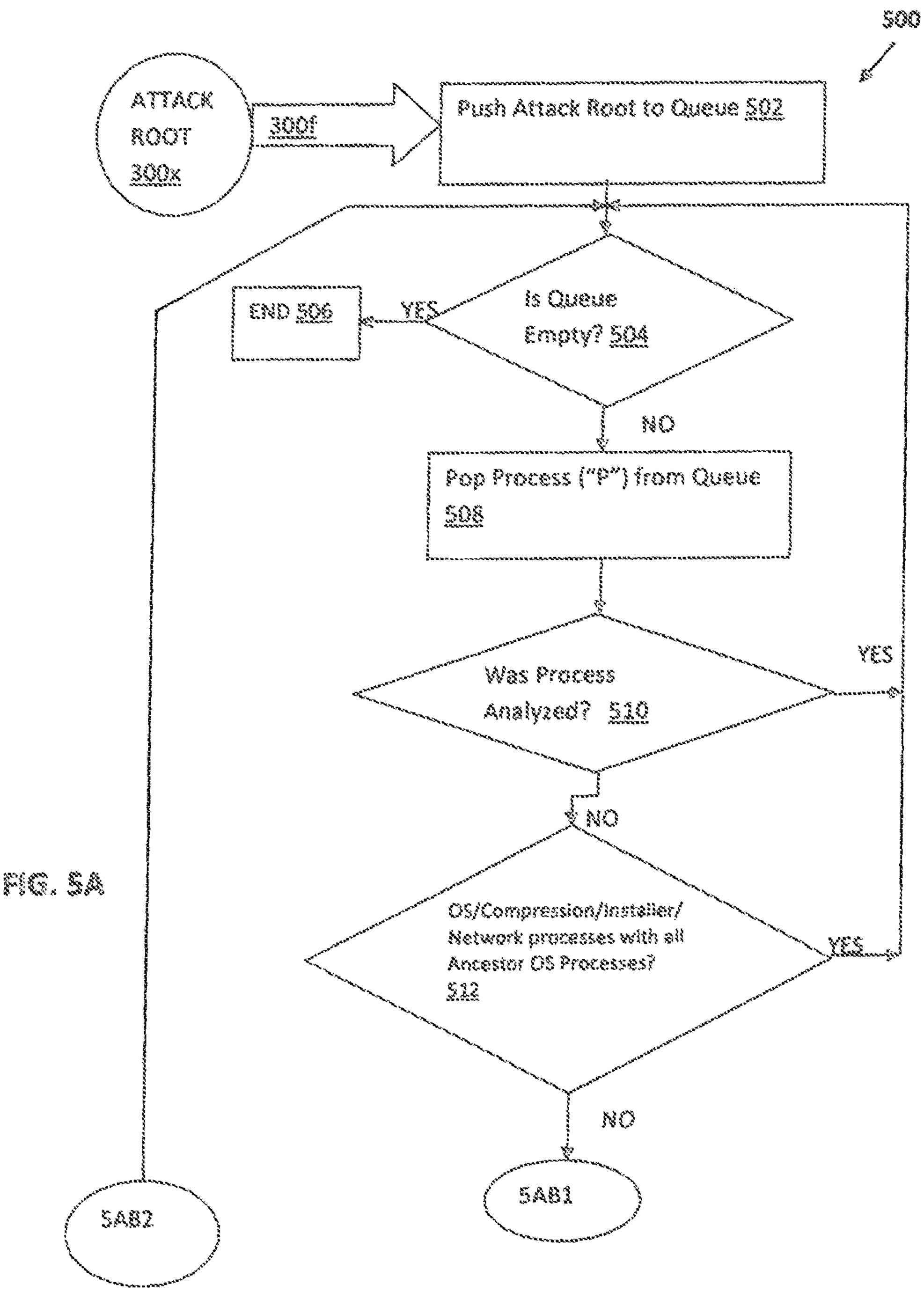
FIGS. 5A and 5B is a flow diagram illustrating an attack tree generating process used for determining summary events according to embodiments of the invention.
Figure 5B:
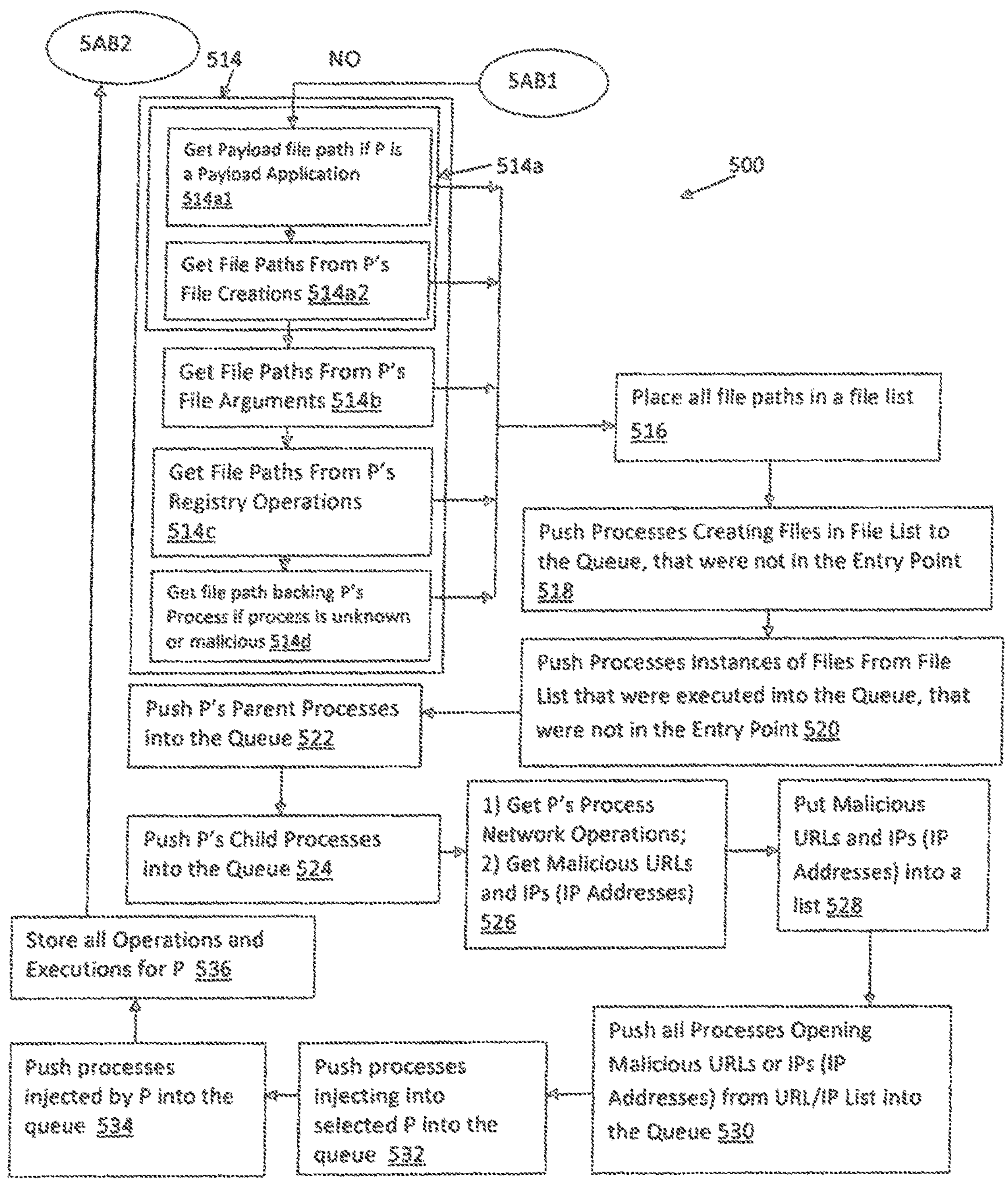

The CPU 122 is formed of one or more processors, including microprocessors, for performing the user computer 120 functions, including executing the functionalities and operations of the agent 130, as detailed herein, the OS 126, and including the processes shown and described in the flow diagrams of FIGS. 4, 5A and 5B. The processors are, for example, conventional processors, such as those used in servers, computers, and other computerized devices. For example, the processors may include x86 Processors from AMD and Intel, Xenon® and Pentium® processors from Intel, as well as any combinations thereof.

The storage/memory 124 is any conventional storage media. The storage/memory 124 stores machine executable instructions for execution by the CPU 122, to perform the processes of the present embodiments. The storage/memory 124 also includes machine executable instructions associated with the operation of the components, including the agent 130, and all instructions for executing the processes of FIGS. 4, 5A and 5B, detailed herein.

The OS 126 includes any of the conventional computer operating systems, such as those available from Microsoft of Redmond Wash., commercially available as Windows® OS, such as Windows® XP, Windows® 7, MAC OS from Apple of Cupertino, Calif., or Linux.

Activity that occurs on the user computer 120 is sensed by a sensor or sensors 136. In particular, the sensors 136 are configured to sense changes that occur on the user computer 120. Examples of activity sensed by the sensors 136 includes, but is not limited to file accesses, network accesses, application accesses, registry accesses, file creations, file modifications, process injections, process calls and process creations. The activity sensed by the sensors 136 is written to (i.e., stored in) an activity log which can be maintained in a structured format, such as, for example, a database(s) 132, accessible by the agent 130, entry point determination module 138 and attack modeling module 139.

The database 132 may be installed with the system 120', or may be provided on a remote server, such as, for example, a cloud server 135 (and remain part of the system 120'). Accordingly, the activity log (stored in the database 132) includes a listing of the executions and creations of the processes, also known as "application processes", and data objects on the user computer 120. The activity log may be programmed or otherwise configured to retain the above mentioned information for blocks of time, for example, weeks, months and years. The activity log may also be programmed or otherwise configured to overwrite information pertaining to older activity with information pertaining to recent activity. As such, the activity log retains information for a sliding window of time. Other database(s) 132 include those associated with stacks, queues, and lists, e.g., file and URL/IP lists, respectively, and detailed below.

The agent 130 makes determinations regarding processes, also known herein as "application processes", executed on the user computer 120 based on the reputations of the processes called, and by extension, the reputations of files that when accessed or opened result in the execution of processes. The reputations of the above mentioned processes and tiles are provided to the agent 130 by a reputation service in the form of a reputation module 134*a*. The reputation module 134*a* is typically provided on a remote server, such as, for example, a cloud server 135, that is accessible by the agent 130. Alternatively, the reputation module 134*a* may be installed on the user computer 120 as part of an anti-malware software suite such as, for example, Microsoft Security Essentials, Norton anti-virus, and McAfee anti-virus. Note that the reputation module 134 may also be installed as part of the agent 130. Accordingly, the agent 130 may be configured to perform processes (not shown) for classifying processes and files into the three above mentioned categories.

The reputation module 134*a* analyzes the files accessed and the processes executed on the user computer 120, either instantaneously or over a period of time. As a result, the reputation module 134*a*, which may also link to a reputation service, is able to classify all application processes executed on the user computer 120 into three categories: malicious processes, unknown processes, and non-malicious processes (i.e., good processes). As an example, processes run from payload applications, for example, MS Word®, MS Excel®, are typically classified as non-malicious processes. The process called by the execution of the Windows® OS executable file sdbinst.exe is also an example of a non-malicious process.

The agent 130 makes determinations regarding events of the application processes, executed on the user computer 120 based on the reputations of the domains called, and by extension, the domains of files, that when accessed or opened result in the execution of processes. The reputations of the above mentioned domains are provided to the agent 130 by a reputation service in the form of a domain reputation module 134*b*. The domain reputation module 134*b* is typically provided on a remote server, such as, for example, a cloud server 135, that is accessible by the agent 130. Alternatively, the domain reputation module 134*b* may be installed on the user computer 120 as part of an anti-malware software suite such as, for example, Microsoft Security Essentials, Norton anti-virus, and McAfee anti-virus. Note that the domain reputation module 134*b* may also be installed as part of the agent 130.

The domain reputation module 134*b* analyzes the files accessed and the processes executed on the user computer 120, either instantaneously or over a period of time. As a result, the domain reputation module 134*b*, which may also link to a reputation service, is able to classify all events executed on the user computer 120 into six categories: 1) suspicious events, 2) damage events, 3) network events, 4) file creates/deletes/modify, 5) hooks or code injections, 6) registry events.

The reputation modules 134*a*, 134*b*, regardless of their locations, may also be part of the system 120'.

An entry point determination module 138 performs processes such as those shown in FIG. 4 and detailed below, for determining the point (location) where the malicious or suspicious process entered the endpoint, for example, the user computer 120, system 120', network (e.g., network node) or the like, and may be based on the initial execution of the attack, e.g., the attack root 300*x* (FIG. 3A) of the malicious process or a suspicious process.

An attack modeling module 139 allows for an attack tree to be created and plotted (diagrammed), based on, for example, the entry point of the malicious or suspicious process, at the requisite endpoint.

To better understand the operation of the components, including the agent 130 and all instructions for executing the processes of FIGS. 4 and 5A and 5B, FIG. 3A shows a diagram of how a malicious attack is analyzed in accordance with the invention, and an example of a malicious attack 300 as carried out on the user computer 120. This example malicious attack is illustrated in FIGS. 3B-1 and 3B-2.

In the example malicious attack, the OS 126 of the user computer 120 is a Windows® OS. The attack 300, illustrated in FIGS. 3B-1 and 3B-2 depicts paths or "events" that include creations of files and data objects (these events exemplified by broken line arrows), execution events, known herein as "events", in which a process (application process) executes (i.e., calls) another process (application process) (results of which are exemplified by solid arrows), and accesses, such as, for example, downloads, uploads, data transfers, and, file transfers, (exemplified by broken line arrows). The broken line arrows and solid line arrows consistent with the aforementioned arrows are in the Legend of FIG. 3A-1. Additional paths in alternative example of attacks, including malicious attacks, may be depicted to show network operations, file modifications, registry entries, injections, mutexes, pipes, hooks, and application arguments.

Figure 3A:
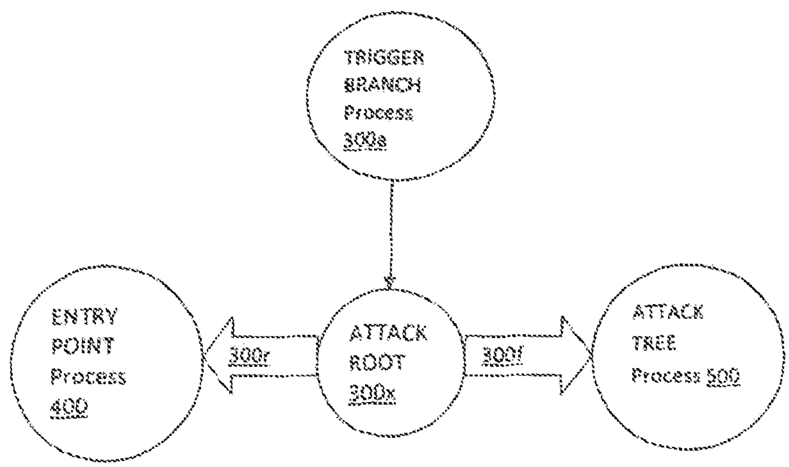
FIG. 3A is a diagram of showing the attack root associated with a malicious attack.
Figures 1, 3B:
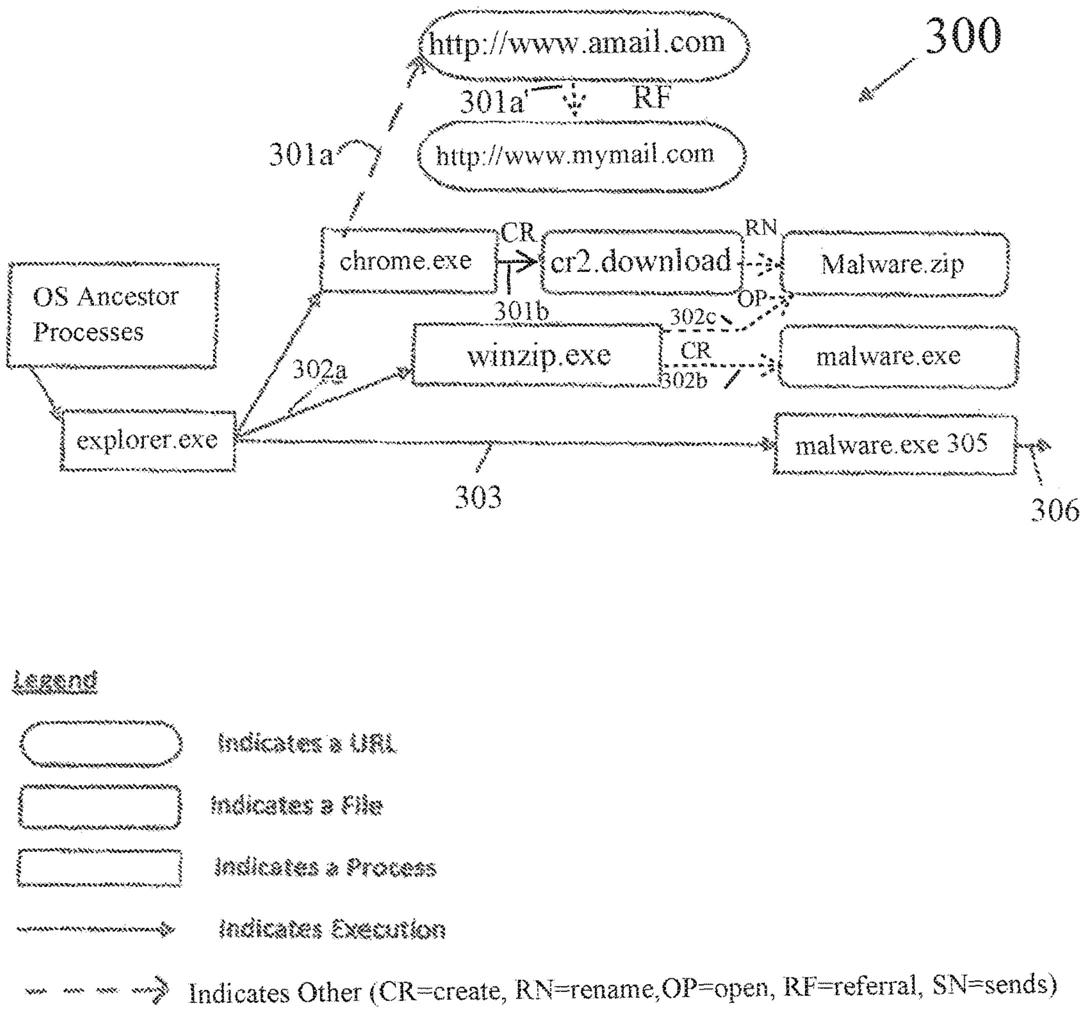
Figures 2, 3B:
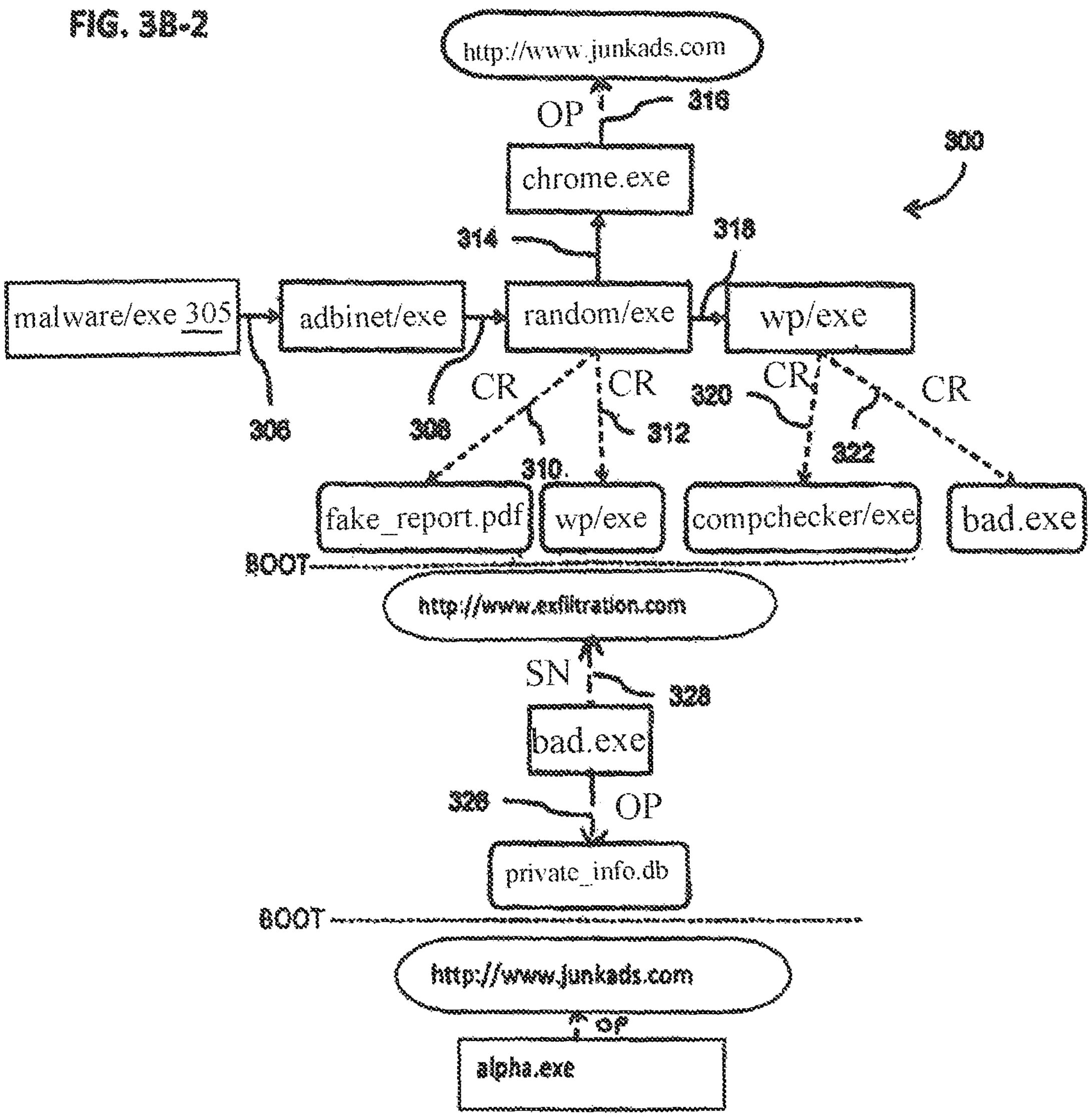

In FIG. 3A, the Attack Root 300*x* is determined, for example, by a trigger branch process 300*a*, which identifies the Attack Root 300*x*. The attack root 300*x*, is provided either externally, or by a trigger branch process 300*a*, as disclosed in commonly owned U.S. patent application Ser. No. 14/963,265 entitled: Method and System for Determining Initial Execution of an Attack. The Attack Root 300*x* is the start of the malicious attack, and is a process, and may include a file. For example, the Attack Root 300*x* may be a payload process such as MS Word® from Microsoft or an unknown or malicious executable. In this case, the attack root as a payload application process (e.g., MS Word®) is such that a document opened in the payload process is the file of the attack root.

The Attack Root 300*x* is preceded (looking backward in time as represented by the arrow 300*r*) by an entry point process 400 (also known as an entry point determining process). The entry point is where and/or how the malicious process or file entered the machine, system, network or the like. The entry point process 400 looks at discrete events in each step of the entry point process 400. An example entry point process 400 is shown in FIG. 4 and is described in association therewith.

The Attack Root 300*x* is proceeded (looking forward in time as represented by the arrow 3000 by an attack tree process 500 (also known as an attack tree generating process). The attack tree process 500 begins at the first malicious execution and shows the damage done to the machine, system or network, by the malicious process or file. The attack tree process 500 looks at the damage caused by the malicious process or file, in terms of processes and threads. An example attack tree process is shown in FIGS. 5A and 5B, and is described in association therewith.

Entry Point Process Overview

An example malicious attack 300 is illustrated in FIGS. 3B-1 and 3B-2, which form a single diagram, to which attention is now directed. The entry point is determined by an entry point process 400 (FIG. 4), which is, for example, performed as an algorithm. The entry point process 400 examines events before the malicious attack to evaluate how the attack entered the system prior to its execution. For example, in FIGS. 3B-1 and 3B-2 the Attack Root (represented in FIG. 3A as Attack Root 300*x*) is the process "malware.exe" 305 which is the identical block in both drawing figures. Also, as FIGS. 3B-1 and 3B-2 combine to form a single entity, the "Legend" of FIG. 3B-1 is also applicable to FIG. 3B-2. Malware.exe 305 is stored, for example, as c:\downloads\malware.exe, with the application process (process) being malware.exe, which executes in memory. A process instance is a special execution of an executable file, at a specific time. There can be multiple process instances of the same executable running at the same point in time, but with different start time times. In addition, these may be multiple instances of an executable running at different times, such as after boots.

The entry point process 400 begins with the attack root 300*x*, also known as the start process for an attack. An example of the attack root 300*x*, which has been determined, is shown in FIG. 3B-1 (and also in FIG. 3B-2). The attack root 300*x* in both FIGS. 3B-1 and 3B-2 is the attack root file, "malware.exe" 305. The entry point is determined, going forward in time, as follows (these steps are the output of the process of FIG. 4):

1. chrome.exe, a process, opened www.amail.com, an email program, as per arrow 301*a;*

2. chrome.exe, a process, opened www.mymail.com, an email program, and www.mymail.com was referred by www.amail.com, as per arrow 301*a';*

3. chrome.exe, a process, created a file cr2.download, at arrow 301*b;*

4. chrome.exe, a process, renamed cr2.download as the container file malware.zip;

5. winzip.exe, a process, opened the file malware.zip, as per arrow 302*c;*

6. winzip.exe created the file malware.exe, as per arrow 302*b*; and, 7. explorer.exe executed three processes, chrome.exe, the process winzip.exe, as per arrow 302*a*, the process malware.exe, as per arrow 303 (OS ancestor processes executed explorer.exe, these OS ancestor processes are a chain of processes from which the machine, system of the like booted up);

8. the process malware.exe 305 executed, as per arrow 306, reiterating that malware.exe 305 is the attack root.

Entry Point Summary Process Overview

These aforementioned events can be summarized by the entry point summary algorithm, which collapses (merges or consolidates) events, e.g., discreet events, from the same process into one summarized event. Common behavior is modeled to achieve a higher level description, such as modeling steps 1-3 above where chrome's download behavior can be described as opening a website and creating a file. Such summarized activity of the steps outline above is fix example as follows:

1. Chrome accessed www.mymail.com and created malware.zip
2. Winzip opened malware.zip and created malware.exe
3. The User 120 (FIG. 1) executed malware.exe, for example, by a mouse "click" or other activation.

Attack Tree Process Overview

Turning to FIG. 3B-2, the execution of the process malware.exe 305 also executes 306 a Windows® OS process, sdbinst.exe. The execution of the process sdbinst.exe causes the execution 308 of the process random.exe.

The execution of the process random.exe causes the execution 314 of the process chrome.exe in order to access 316 the web site www.junkads.com. The execution of the process random.exe also causes the creation 310 of the file fake_report.pdf. The execution of the process random.exe also causes the creation 312 of the file wp.exe. The execution of the process random.exe also causes the execution 318 of the process wp.exe based on the created file wp.exe 312.

The execution of the process wp.exe causes the creation 320 of the file compchecker.exe, and the creation 322 of the file bad.exe. The creation of the file bad,exe by the process wp.exe additionally places the file bad.exe in the OS startup folder, for example, the Windows® OS startup folder. As a result, upon rebooting (i.e. reloading of the OS 126 into memory) and/or restarting of the user computer 120, indicated by "BOOT" in FIG. 3B-2, the process had.exe is, for example, executed by a Windows® OS process, such as, explorer.exe (not shown).

The execution of the process bad.exe causes the access 326 of private information on the user computer 120, namely private_info.db. The execution of the process bad.exe also causes data to be sent to the URL http://www.exfiltration.com, via network transfer 328, of information accessed on the user computer 120 to external parties.

In a second BOOT, i.e., restarting of the user computer 120, a process alpha.exe opens the URL http://www.junkads.com.

As should be apparent, the application processes executed, and files created during the malicious attack illustrated in FIGS. 3B-1 and 3B-2, span across multiple boots of the user computer 120. Specifically, the activities described by the identifiers 301-322 are executed and/or created on the user computer 120 subsequent to a first boot of the user computer 120, whereas the activities described by the identifiers 326, 328 are executed and/or occur on the user computer 120 subsequent to a second boot of the user computer 120 that occurs after the first boot. As a result, the application process bad.exe persists even after termination of the application process wp.exe.

Accordingly, the application process malware.exe, and the process bad.exe, are linked by a sequence of application processes, the creations and executions (i.e., calling) of which are retained in the activity log. Each application process in the sequence is successively linked to at least one other application process in the sequence. Moreover, each application process stemming from the initial process execution of the attack is linked to the process malware.exe by a sequence of processes. The activity log provides the agent 130 with the necessary information for ascertaining the above mentioned process linkages.

In the context of this document, the term "ancestor process" or "ancestor processes" of a specific process generally refers to the process or processes that were previously successively called in order to execute the specific application process. For example with respect to the malicious attack 300 of FIGS. 3B-1 and 39-2, the ancestor processes of wp.exe are the following application processes: explorer.exe, malware.exe, sdbinst.exe, and random.exe. Accordingly, the ancestor process or processes of a specific process identified as part of a malicious attack are used to provide the above mentioned linkage between the initial process execution of the attack and the specific process.

The "attack tree" is referred to as a tree, as the attack tree is the graphic representation of a hierarchy. Accordingly, the attack can be viewed as a virtual tree, which is non-binary and is formed of nodes and branches. The nodes are, for example, process instances, including those which may occur after boots. The branches represent, for example, executions, creations, and injections. The creations and executions as part of the tree are possible with the invention, since nodes can occur after boots. The start of the tree is the attack root.

Entry Point Determining Process

Attention is now directed to FIG. 4, which shows a flow diagram detailing a computer-implemented process 400 in accordance with embodiments of the disclosed subject matter. This computer-implemented process includes an algorithm for determining the entry point fix malware or other suspicious process, in particular, the entry point of where the malware or suspicious process entered the endpoint, such as a system, machine, network (e.g., network node), or the like. Reference is also made to elements shown in FIGS. 1, 2, 3A, 3B-1 and 3B-2. The process and subprocesses of FIG. 4 are computerized processes performed by the system 120' including, for example, the CPU 122 and associated components, such as the entry point determination module 138, at the user computer 120, which as shown represents a client or client computer. The aforementioned processes and subprocesses can be, for example, performed manually, automatically, or a combination thereof, and, for example, in real time.

Initially, the process 400 of the invention for determining the entry point of the attack (hereinafter, "the entry point determining process"), begins at the Attack Root 300*x* and looks backward (rearward) in time, as indicated by the arrow 300*r*, as described above for FIG. 3A.

The entry point determining process now moves to block 402. At block 402, the attack root process 300*x*, i.e., now the application process, which ran or executed, including process details, is received as the input application process. Next, at block 404, the system 120' determines whether the application process exists, e.g., is the application process known to the system 120', and as such, exists in historical databases of the system.

At block 404, should the application process not exist, the entry point determining process ends at block 406. However, at block 404, should the application process exist, as it is known to the system, as it is stored in the database, and the entry point determining process moves to block 407. At block 407, it is determined whether the application process is an OS (Operating System) process with ancestor OS processes, for example, Windows® (Microsoft® of Redmond Wash., USA). If yes, at block 407, the entry point determining process moves to block 406, where it ends. If no, at block 407, the entry point determining process moves to block 408.

At block 408, the type of the application process is determined. This determination is typically made by the reputation module 134. The entry point determining process then moves to any of blocks 410*a*-410*d*, 411, 412 and 413, based on process type. For example, application processes 410*a*-410*d* are all processes that end up with a file path, and are processes in a loop. A "file path" as used in processes 400 and 500 of FIG. 4, and FIGS. 5A and 5B is, for example, a directory/location, such as in memory, storage media or the like, where the file is stored.

Application process 411 is for registry consumer application processes (processes) that progress to a registry key, which is also in the aforementioned loop. Application process 412 is for network processes, and does not follow the aforementioned loop. Application Process type 413 is for all other application process, which are not in accordance with the types of blocks 410*a*-410*d*, 411 or 412, and follows the aforementioned loop.

At block 410*a*, a payload process is a process or application which is typically benign, but can carry malicious data. Some exemplary payload processes (applications) are those from. Microsoft® Office®, as well as PDF Reader from Adobe®. The process moves to block 420, where it is determined the path of the payload file which was opened in the payload process. For example, should the payload application process be MS Word®, it would be important to know the file path of the document opened in MS Word®. Also, in the cases of a process type being detected as executed by explorer.exe (from Microsoft®), when extracted from a .zip file, this will be classified as a payload process and accordingly, the entry point determining process moves to blocks 410 and then to block 420 as detailed immediately above.

The entry point determination process then moves to from block 420 to block 430. At block 430, the application process that created the previous file's path, i.e., the application process that created the file path of block 420, is determined.

Returning to block 410*b*, a container/compression/installer (install helper) application process has been detected. A "compression application," as mentioned above, is an application whose primary purpose is to reduce file size, making the file easier to store and send. Example compression applications include .zip applications, RAR applications (RAR is a proprietary archive file format that supports data compression, error recovery and file spanning), and 7z applications (7Z files are created by 7-Zip, a file archive compression utility that can be used on any computer. These files can be opened using any available compression program, including the 7-Zip, an open source tool. Opening 7z files is done for example, as disclosed at: http://www.openthefile.net/extension/7z. The process moves to block 422, where the file that was opened in the container/compression/installer application, such as .zip files, is determined. The entry point determination process then moves to block 422, where the container file's path, of the container file which was opened, is determined.

The entry point determination process then moves to block 430, where the application process that created the previous file's path, i.e., the application process that created the file path of block 422, is determined.

Returning to block 410*c*, the application process is an executable. Executables include, for example, in a Windows® environment, .exe, .ser, .bat, and, .com files. The entry point determining process moves to block 424 where the file path of the executable is obtained.

The entry point determination process then moves to block 430, where the application process that created the previous file path, i.e., the application process that created the previous file's path, i.e., the application process that created the file path of block 424, is determined.

At block 410*d*, the process type is a rename application process, and is determined. The entry point determination process then moves to block 426, where the original file's path, from where the renamed process was renamed is determined.

The entry point determination process then moves from block 426 to block 430. A block 430, the application process that created the previous file's path, i.e., the application process that created the file path of block 426, is determined.

Returning to block 411, the application process is a registry consumer application process, for example, REGEDIT. The entry point determining process moves to block 428 where the registry key is obtained. The entry point determination process then moves to block 430, where the application process that created the registry key (of block 428), is determined.

Returning to block 430, the entry point determination process moves to block 432, where the output of the loop is stored, for example, in storage media, such as a stack. The entry point determination process then moves from block 432 to block 404, from where the respective application processes are resumed from block 404 of the entry point determination process. Moving to block 412, the application process is a network process. A "network process/application" is a process/application whose primary purpose is to initiate and maintain a connection between the machine it is running on and other machines, along a network, or over the Internet. Network applications include, for example, browsers, FTP (file transfer protocol) clients, and e-mail clients. From this network process 412, any URLs (Uniform Resource Locators) and IP (Internet Protocol) addresses, that were opened by the network process are determined, such as the URL of a web site which hosted the network process, at block 440. Next, any referral URLs, e.g., URLs opened previous to the URL of block 440, are determined at block 442, such as the URL of a web site which hosted the network process.

The entry point determining process moves to block 444, where the output of blocks 412, 440 and 442 is stored, for example, in storage media, such as a stack. This stored output, in addition to the process instances, executions, creations, injections and the like, associated with various events, may also include information as to the time of the events.

It is then determined whether any of the URLs (from blocks 440 and 442) exist (are present) in the database, at block 446. If yes, there is a loop back to block 440, from where the process continues. If no, the process moves to block 448, where the calling process for the URL and/or IP is determined. The entry point determining process then moves to block 404, where the calling process is the application process for the resumption of the entry point determination process, from block 404.

Returning to block 413, the application process is a process that is not one of the application processes of blocks 410*a*-410*d*, 411 or 412. An exemplary "other" process may be a MUTEX. The entry point determining process moves to block 429 where the object, e.g., iexplore.exe, is obtained.

The entry point determination process then moves to block 430, where the application process that created the previous object, i.e., the application process that created the object of block 429, is determined. From block 430, the entry point determining process moves to block 432, where output is stored in the stack, and then to block 404, from where it resumes.

Entry Point Determining Process—Example

Referring back to FIGS. 3A and 3B-1 and example of the entry point determining process 400 of FIG. 4 is now described. Initially, from FIG. 3A-1 the Attack Root 300*x* is the process "malware.exe", of FIG. 3B-1.

The process malware.exe is the input application process (process) of block 402, and exists at block 404. It is not an OS process with all ancestor OS processes at block 407, and at block 408, its application process type is an "Other executable of block 410*c*. The file path of block 424 is that of malware.exe (for example: c:\downloads\malware.exe"). Winzip.exe was the creator application process for malware.exe at block 430, so winzip.exe is now the application process at block 404, from where the entry point determining process resumes. The stack at block 432 now contains: "winzip.exe created malware.exe".

Resuming from block 404 with winzip.exe, this application process exists at block 404. It is not an OS process with all ancestor OS processes at block 407, and at block 408, its application process (process) type is a "container/compression/installer application process" of block 410*b*. The container file path of block 422 is the container file opened in winzip.exe at the time of creation of the malware.exe. In this example, the container file opened is "malware.zip". Block 430 then determines the creator process of malware.zip which is chrome.exe. From block 430, the output is stored in a stack, as per block 432. The stack at block 432 now contains: "winzip opened malware.zip. winzip.exe created malware.exe". From block 432, the entry point determining process moves to block 404, from where it resumes. Chrome.exe (from block 430) is now the application process at block 404, from where the entry point determining process resumes.

Resuming again from block 404 with chrome.exe, this application process exists at block 404. It is not an OS process with all ancestor OS processes at block 407, and at block 408, its process type is a "Rename process" of block 410*d*. The original file path which had the file name "cr2.download", prior to the rename is extracted, at block 426.

At block 430, it is then determined that the creator process of "cr2.download" was chrome.exe. The output is stored in the stack at block 432. The stack now contains: "chrome created cr2.download, chrome renamed. cr2.download to malware.zip. winzip opened malware.zip. winzip.exe created malware.exe". From block 430, and moving through block 432, chrome.exe is now the application process at block 404, from where the entry point determining process resumes.

Resuming from block 404 with chrome.exe, this application process exists at block 404. It is not an OS process with all ancestor OS processes at block 407, and at block 408, its process type is a Network Process of block 412, as chrome.exe called the e-mail websites, www.mymail.com, which was referred from amail.com.

At block 440 the URL obtained is www.mymail.com, and the referral URL of block 442 is www.amail.com. Moving to block 444, the stack now contains: "chrome accessed www.amail.com and was referred to www.mymail.com. chrome created cr2.download, chrome renamed cr2.download to malware.zip. winzip opened malware.zip. winzip.exe created malware.exe".

At block 446, no more referral URLs exist, with explorer.exe being the calling process for chrome.exe, at block 448. Accordingly, explorer.exe is now the process at block 404, from where the entry point determining process resumes.

Resuming from block 404 with explorer.exe this process exists at block 404. As explorer.exe is an OS process with all ancestor OS processes at block 407, the entry point determining process moves to block 406 where it ends.

Popping from the stack, the following events occur:

1. chrome accessed www.amail.com and was referred to www.mymail.com,
2. chrome created cr2.download.
3. chrome renamed cr2.download to malware.zip.
4. winzip opened malware.zip.
5. winzip.exe created malware.exe.

Entry Point Summary Determining Process—Example

Taking the example from the previous section the entry point summary process simply takes the first event and last event of each set of sequential events that share the same process instance. This results in the following:

1. chrome accessed www.amail.com and creates malware.zip
2. winzip opens malware.zip and creates malware.exe Attack Tree Generating Process Attention is now directed to FIGS. 5A and 5B, which show flow diagrams detailing a computer-implemented processes 500 for generating an attack tree in accordance with embodiments of the disclosed subject matter. Reference is also made to elements shown in FIGS. 1, 2, 3A, 3B-1, 3B-2. The process and subprocesses of FIGS. 5A and 5B, are computerized processes performed, for example, by the system 120'. The aforementioned processes and sub-processes can be, for example, performed manually, automatically, or a combination thereof, and, for example, in real time.

FIGS. 5A and 5B detail an example attack tree generating process 500. The results of this process, e.g., the output is plotted, by the system 120', for example, by the attack modeling module 139 (in conjunction with the CPU 122, Storage/Memory 124 and OS 126), so that it appears as a graphic, in accordance with the attack tree shown in FIGS. 3B-2. The output of this attack tree generating process includes process instances and all of their operations, for example, such as, all network file registries, memory operations, injections, and the like.

The process 500 begins at the Attack Root 300*x*. As indicated above, the Attack Root 300*x* for the process 500 originates with a Root process, provided from multiple sources, including, for example, a trigger branch process, from commonly owned US Patent Application, entitled: Method and System for Determining Initial Execution of an Attack Ser. No. 14/963,265. As the attack tree generating process 500 looks forward to determine damage caused by the malicious attack, the forward looking nature of the process 500 is illustrated by arrow 300*f*, as the attack tree generating process moves to block 502.

At block 502, the attack root 300*x* is pushed into the queue, e.g., storage media in the system 120'. Next, at block 504, it is determined (by the system 120'), whether the queue is empty. Should the queue be empty at block 504, the attack tree generating process ends, at block 506. Should the queue not be empty at block 504, the process moves to block 508

Moving to block 508, an iterative process of the attack tree generating process begins, as application processes, referred to as "P", are read from the queue in succession, or "popped" from the queue. With each application process being removed and read, or "popped" from the queue. When an application process "P" is popped from the queue, this application process is part of the attack.

The attack tree generating process moves to block 510, where it is determined whether the process "P" was analyzed by the system 120'. If yes, the attack tree generating process moves to block 504, from where it resumes, as detailed above. If no, the attack tree generating process moves to block 512.

At block 512, it is determined whether the application process "P" is an OS/compression/network process with ancestor OS processes. If yes, at block 512, the attack tree generating process moves to block 504, from where it resumes, as detailed above. If no, at block 512, the attack tree generating process moves to block 514.

At block 514, formed of blocks 514*a*, 514*b*, 514*c*, 514*d* where file paths from application processes are obtained and placed into a file path list, at block 516. The file list includes, for example, a list in a database or other storage associated with the system, machine or the like.

At block 514*a*, file paths are obtained from application process "P's" file operations, for example, by looking for files created, renamed, written to, read or executed by the application process files. At block 514*a*1, one of the blocks that makes up block 514*a*, the payload file path is obtained should P be a payload application process. For example, if the payload process was MS Word®, it would be important to know the file path of the document opened in MS Word®. At block 514*a*2, the system 120' gets file paths from P's file creations (files created and renamed by P).

Moving to block 514*b*, file paths are obtained from application process "P's" file arguments, e.g., parameters, such as cmd.exe, c:/ibabatch.bat. Moving to block 514*c*, file paths from the application process "P's" registry operations are obtained, e.g., that are part of the value of the registry keys put into the file list For example, the registry contains keys which controls the processes start up on a reboot. This algorithm extracts the file paths of processes that run on reboot from the registry.

Moving to block 514*d*, the file path backing the application processes "P's" is obtained, if the application process is unknown or malicious. The determination of unknown or malicious is based on the reputation of the file, as determined, for example, by the reputation module 134, which may be a reputation service. For example, should the file be from an entity with a good reputation, such as Microsoft®, Google® or the like, the reputation is "good", and the file backing P's process will not be obtained. The file paths obtained at blocks 514*a*-514*d* are then placed into a file list, at block 516.

From block 516, movement is to block 518, where application processes (processes) creating file paths in the aforementioned file list, that were not in the entry point, are pushed (sent) to the queue. Next, at block 520, process instances of tiles from the file list that were executed, that were not in the entry point, are pushed (sent) to the queue. Optionally, blocks 518 and 520 may be switched in their order.

The attack tree generating process moves to block 522, where the application process "P's" parent application processes (e.g., of the executed application processes) are pushed (sent) to the queue. Next, at block 524, the application process "P's" child application processes of the executed application processes) are pushed (sent) to the queue.

Moving to block 526, the application process "P's" network operations are obtained, and malicious URLs and malicious IPs (malicious IP addresses), e.g., those URLs and IP addresses associated with malware or other suspicious processes are obtained. For example, the malicious (and or suspicious) URLs or Internet Protocol addresses (IPs) are moved to a URL/IP list, at block 528. The list is, for example, in storage media in the system 120'.

The attack tree generating process then moves to block 530, where all application processes which opened malicious (or suspicious) URLs or IPs (from the URL/IP list) are pushed to the queue. From block 530, the attack tree generating process moves to block 532, where application processes injecting the currently selected application process "P" are pushed (sent) to the queue. Next, at block 534, the application processes injected by the currently selected application process "P" are pushed (sent) to the queue.

From block 534, the attack tree generating process moves to block 536, where all operations and executions of P (for this iteration) are stored (e.g., in storage media). From block 536, the attack tree generating process returns to block 504, from where it resumes, in accordance with the description above.

Once all iterations of the attack tree generating process end, as the attack tree generating process ends at block 506, all application processes and files of the attack tree and their relationships to each other is all known. All output from the process 500 has been obtained and the attack tree, for example, similar to that shown in FIGS. 3B-1 and 3B-2 can be plotted, or otherwise illustrated, from the aforementioned output graphically.

Although an example order for the subprocesses of the attack tree generating process 500 is shown in FIGS. 5A and 5B and detailed above, the subprocesses of the attack tree generating process may be grouped as follows (with each group of blocks from FIGS. 5A and 5B in square brackets): [514, 516, 518, 520], [522], [524], [526, 528, 530], [532], [534], [536]. The groups of blocks (subprocesses of the attack tree generating process) may then be performed in any order desired.

Attack Tree Generating Process—Example

Referring back to FIGS. 3A and 3B-2 an example of the attack tree determining process of FIGS. 5A and 5B is now described. Initially, from FIG. 3A, the attack root 300*x* is the application process malware.exe 305 of FIG. 3B-2. For purposes of this example, the processes malware.exe, random.exe, wp.exe and bad.exe are considered to be of unknown reputation.

The application process malware.exe 305 is the input application process of block 502. Next, at block 504, the queue, by definition, is not empty. Also, in this example, the queue contains only unique application processes, only a single occurrence of each application process is in the queue at any given time. At block 508, the application process malware.exe is popped from the queue, and this application process is not an OS/Compression/Network process at block 512. At blocks 514*a*1, 514*a*2, 514*b* and 514*c*, there are not any file paths for the file list. However, at block 514*d*, the process malware.exe is considered to be unknown, so the file path which goes into the file list, at block 516, is the file malware.exe. At block 518 and 520, nothing is added to the queue, since malware.exe was part of the entry point. Winzip.exe is excluded, because it is at the entry point, and malware.exe is excluded because it has already been processed and there are no other instances of malware.exe running in this example.

Next, at block 522, the parent application process explorer.exe is pushed into the queue, as is the child sdbinst.exe, at block 524. Blocks 526, 528, 530 are bypassed, as there are no malicious URLs or malicious IP addresses, and absent injections, blocks 532 and 534 are bypassed. The executions and operations of P are stored in storage media, at block 536, and the attack tree generating process then resumes from block 504, with the application processes (processes) explorer.exe and sdbinst.exe in the queue, Explorer.exe is now popped from the queue, at block 508, and it has not yet been analyzed at block 510. However, once block 512 is reached, explorer.exe is an OS/compression/network process with all ancestor OS processes. Accordingly, the attack tree generating process returns to block 504, from where it resumes.

The application process sdbinst.exe is now popped from the queue, at block 508. It was not analyzed previously, as per block 510 and is not an OS/compression/network process with all ancestor OS processes, at block 512. Blocks 514 (514*a*1-514*d*) do not apply here, and blocks 516, 518 and 520 also do not apply here. At block 522, the parent process malware.exe is pushed into the queue and at block 524, the child process random.exe is pushed into the queue. Blocks 526, 528, 530, 532 and 534 are not applicable here, and at block 536, the executions and operations of P are stored in storage media. The attack tree generating process then resumes from block 504, with malware.exe and random.exe, as the processes in the queue, The process malware.exe is popped from the queue at block 508. At block 510, the process malware,exe was analyzed, so the attack tree generating process returns to block 504. The application process random.exe remains in the queue.

From block 504, the attack tree generating process moves to block 508, where the application process random.exe is popped from the queue. This application process was not previously analyzed, at block 510, nor is it an OS/compression/network process with all ancestor OS processes, at block 512. Block 514, block 514*a*2 are applicable as files fake_report.pdf and wp.exe are obtained and placed into a file path list, at block 516. Block 518 does not result in an addition to the queue, since random.exe, the process creating the file paths in the file path list, is being analyzed by the attack tree generating process. At block 520, the application process wp.exe, which is a process instance of the file wp.exe, which was executed, is pushed into the queue. At block 522, the parent process sdbinst.exe is obtained and pushed to the queue, and at block 524, the child processes chrome.exe and wp.exe are obtained, with chrome.exe pushed to the queue. Wp.exe is not pushed to the queue, as it is already in the queue from block 520. Blocks 526, 528, 530 are bypassed, as there are no malicious URLs or malicious IPs, and absent injections, blocks 532 and 534 are bypassed. The executions and operations of P are stored in storage media, at block 536. The attack tree generating process then resumes from block 504, with the application processes (processes) wp.exe, sdbinst.exe, and chrome.exe in the queue.

From block 504, and moving to block 508, the application process wp.exe is popped from the queue. This application process was not previously analyzed, at block 510, nor is it an OS/compression/network process with all ancestor OS processes, at block 512. The attack tree generating process then moves to block 514, where at block **514*a*2, the file paths for compchecker.exe and bad.exe are obtained, and placed on a file list, at block 516. At block 518, wp.exe is not pushed to the queue, since wp.exe, the process creating the files in the file list, is being analyzed by the attack tree generating process. At block 520, the application process bad.exe, which is a process instance of the file wp.exe, which was executed, is pushed into the queue. At block 522 the parent process random.exe is added to the queue. Block 524 is bypassed as there is not a child process of wp.exe. Blocks 526, 528, 530 are bypassed, as there are no malicious URLs or malicious IP addresses, and absent injections, blocks 532 and 534 are bypassed. The executions and operations of P are stored in storage media, at block 536. The attack tree generating process then resumes from block 504**, with the application processes sdbinst.exe, chrome.exe, bad.exe and random.exe in the queue.

Sdbinst.exe is now popped from the queue, at block 508, and once block 510 is reached, sdbinst.exe was previously analyzed. Accordingly, the attack tree generating process returns to block 504, from where it resumes, with chrome-.exe, bad.exe and random.exe in the queue.

From block 504, chrome.exe is now popped from the queue, at block 508. This application process was not previously analyzed, at block 510, nor is it an OS/compression/network process with all ancestor OS processes, at block 512. The attack tree generating process then bypasses blocks **514*a*1, 514*a*2, 514*b* and 514*c*, as this is not a payload application process, there are not any tile creations, not any file arguments and not any files from registry operations. Block 514*d* is not satisfied, as chrome.exe is a known process with a "good" reputation, as chrome is from Google® (as rated by a reputation service). At block 522, the parent process random.exe is not pushed into the queue as it already exists in the queue. Block 524 is not applicable, as there is not a child, but at block 526, the same malicious URL http//www.junkads.com is obtained and placed on a list, at block 528. At block 530, the process alpha.exe which opened the malicious URL http://www.junkads.com, is pushed into the queue. Absent injections, blocks 532 and 534 are bypassed. The executions and Operations of P are stored in storage media, at block 536. The queue holds the application processes, bad.exe, random.exe, and alpha.exe. Only one instance of random.exe is in the queue. The attack tree generating process then resumes from block 504**.

From block 504, the application process bad.exe is popped from the queue, at block 508. At block 510, this application process was not previously analyzed and it is not an OS/compression/Network process of block 512. Blocks 514-520 are not applicable, and at block **514*d*, the file paths associated with the file private_info.db was read and not created, such that block 514*a*2 is not satisfied. The URL http://www.ex.filtration.com, attended to at blocks 526 and 528, does not have a process associated with it at block 530. The parent application process, from block 522, is explorer.exe (not shown), which is pushed into the queue All other blocks 524, 532, and 534 are not applicable. The executions and operations of P are stored in storage media, at block 536. The attack tree generating process resumes from block 504**, with random.exe, alpha.exe and explorer.exe, in the queue.

From block 504, the application process random.exe is popped from the queue, at block 508. As this application process was previously analyzed at block 510, the attack tree generating process returns to block 504, with the application processes alpha.exe and explorer.exe in the queue.

From block 504, and moving to block 508, the application process alpha.exe is popped from the queue. At block 510, this application process was not previously analyzed and it is not OS/compression/Network process of block 512. Blocks 514-520 are not applicable. At block 522, the parent process explorer.exe (a different instance thereof, based on ID and execution time, for example, and referred to herein as explorer.exe (second instance), is pushed to the queue. Blocks 524, 526, 528, 530, 532 and 534 and bypassed as they are not applicable. The executions and operations of P are stored in storage media, at block 536. With two instances of explorer.exe now in the queue (explor.exe and explorer.exe (second instance)), as the attack tree generating process resumes from block 504.

Moving from block 504 to block 508, explorer.exe is popped from the queue. At block 510, this application process was not previously analyzed, so the attack tree generating process moves to block 512. At block 512, explorer.exe is an OS process, the process returns to block 504. Explorer.exe (second instance) remains in the queue.

Moving from block 504 to block 508, explorer.exe (second instance) is popped from the queue. At block 510, this application process was not previously analyzed, so the attack tree generating process moves to block 512. At block 512, explorer.exe (second instance) is an OS process, the process returns to block 504.

The queue is now empty at block 504, so the attack tree generating process moves to block 506, where it ends.

Summary Events Determining Process

Referring back to FIGS. 3A and 3B-2, which illustrate an example attack tree, and an example of the attack tree determining process of FIGS. 5A and 5B, the process of obtaining summary events is now described, with respect to FIGS. 6A, 6B, 6C-1, 6C-2, 6D-1 and 6D-2. The process of obtaining summary events allows various events to be filtered, focusing only on events which are significant indicators of malware, threats and the like. While an attack tree may be formed of processes that may consist of hundreds to thousands of events, the process of the invention isolates summary events, focusing on a much smaller number of highly significant events in order to rapidly and efficiently convey the history of the attack. The history of the attack may include events like sites visited, documents accessed, elements compromised, and the like.

Summary Events

The summarized set of events, with each event known as a "summary event," are events of importance in order to describe the attack on the endpoint. Summary events include, for example, damage events, suspicious events, network events, along with processes, such as file creates (including new creations and renames)/deletes/modifies/copies, appends and reads, code injections and hooks, including process execution and Windows® Hooks, network processes including Internet Protocol (IP) as Transmission Control Protocol (TCP) processes of TCP Send and TCP receive, and URLs of Hypertext Transport (HTTP) processes of HTTP(S) (HTTP Secure) Post and HTTP(S) get, and registry processes, including Create/Modify/Delete and Read. Additional events may also be defined by the user, system administrator, or the like, and programmed into the system 120', as summary events. Additionally, any of the aforementioned summary events may be in combinations, such that both events of the combination must qualify as summary events, for the combination to be a summary event.

Also, for example, some events such as registry reads and file opens for non-document files are typically not summary events. However, under certain conditions, they may be considered as summary events.

Damage Events

Certain summary events are classified as "Damage Events." Damage Events are typically those that identify the attacker's goals. Some examples of these include accessing, manipulating or compromising business data and credentials. Exemplary business data includes banking credentials, corporate documents, capturing all keyboard activity, and the like. For example, exemplary damage events include, but are not limited to:

- Data Loss Events
  - Accessing company documents
  - Accessing databases
  - Exfiltration of data from the organization to the outside
- Data Tampering
  - Changing data in the system
  - Including for example, user data, system data
- Data Ransom
  - Encrypting a document and decrypting the document for a fee
- Privacy Violations
  - Accessing browser history
  - Accessing browser cookies
- Credential Theft
  - Accessing user passwords
  - Accessing password hashes
- Activity Loggers
  - Logging all keystrokes
  - Logging mouse or pointing device activity
- Lateral Movement
- USB or Removable Device Tampering
- Click Fraud
- Bit Coin Mining
- Bot Activity, for example, sending of Spam, starting and maintaining Denial of service (DoS) attacks Suspicious Events Of those events recorded by the Virtualized Attack Tree Algorithm, certain events may be considered to be highly suspicious behavior for a process. The process involved may or may not be malicious, however, through execution, code injections and other means it may be made to do something suspicious. These suspicious events can be scored based on severity, categorized, displayed (textually and in a User interface (UI)) and sorted.

Separately, the scores and context of suspicious events may be used to determine whether a process or processes are malicious, which typically translates to an attack taking place. In other words the following events are considered "Suspicious Events", and are useful to detect attacks. For example, exemplary suspicious events include, but are not limited to:

Injections/Hooks: A process is attempting to inject into other processes in order to influence their execution. These operations when performed by untrusted processes are considered to be highly suspicious.

Name Trickery: Process names that are designed to hide their extension as being executables (e.g. docuement.pdf.exe). Malware will use this technique to trick users into thinking an executable file is a document or image, enticing them to open it.

Incident Start Deletion: A process has attempted to delete the incident start process. Malware will often use this technique in an attempt to avoid detection.

Dropped File Deletion: A file which was created as part of the incident is later deleted by elements of the same incident. This is a common behavior of malware attempting to cover up its tracks.

Executable Copy: A copy of an executable (same hash signature) having a different path, was launched by the incident. This is a common technique used by malware in order to attempt evasion and to increase malware persistency in case elements of it are deleted or quarantined.

Privilege Change: A process is running at a different privilege than the incident start process. Malware will often attempt to elevate process privileges in order to gain full system access.

Name Impersonation: A process has a name that is exactly the same or very similar to a well known process name. Malware will often do this to hide malicious processes from casual inspection.

HTTP Anomaly: HTTP communication patterns which could indicate malware activity. Examples: HTTP POST not preceded by a GET request or numerous HTTP POST requests which could represent C&C communications or data exfiltration.

Process in AppData: A process was saved in the AppData folder which is a common location for malware to run.

Process in Temp: A process was saved in the Temp folder which is a common location for malware to run.

Process in Documents: A process was saved in the Document folder which is an uncommon location for processes to run from.

Abnormal Behavior: A process is behaving differently than expected. For example: Word creates an executable or Notepad accesses a Uniform Resource Locator (URL).

Abnormal Launch: A process has a child process that is not commonly launched by it—for instance winword.exe launching an unknown process.

Large Registry Writes: A process wrote a large amount of data into the registry. Malware might use the registry to store executable code. This behavior is used by 'fileless' malware which attempts to avoid detection and removal.

Ransom Message Creations: A process may be writing ransom messages to disk in order to display them using another program.

Ransom Message Display: A process is being used to potentially display a ransom message display.

Dropped Executable: One or more executable files were created.

Dropped One or more DLL (Dynamic Link Library) files were created.

Dropped Script: One or more script files were created.

Executable Tampering: An executable file was modified by a process in the incident. This may be for ransom purposes or to cause execution of malicious code.

Zone Info Deletion: The Zone identifier is an alternate data stream containing information about where a file was received from (Intranet, Internet etc.), Malware like to delete this data to hide where they came from.

Extension Mismatch: A file was created and opened by a process that normally does not open file types similar to that of the file. For example, a txt file was created that is actually a dll that is then opened in rundll32.exe. Used by malware to hide potentially dangerous files.

Mass IP Access: A process has attempted to connect to a large number of unique IPs. Malware will often use this technique in an attempt to hide Command and Control (C&C) communication.

PHP Script Access: A process has attempted to connect to one or more URLs executing a php script. Malware will often do this to download or upload files and information.

Terminate Process: A process has attempted to terminate another process. Malware will often do this to prevent processes from running that may interfere with its operations.

Log Tampering: wevtutitexe is a Windows® system process which might be used to tamper with the Windows® Logs in order to thwart incident response.

Dangerous Execution: System processes such as cmd.exe being executed as part of the incident. While these processes can be loaded legitimately, their use is relatively rare and is often used by malware.

Script Execution: Processes used to run scripts like PowerShell and cscript. These processes are widely used in malware attacks.

Persistence: The incident performed persistence actions to ensure execution after system boot. Persistence is performed by setting specific system registry keys or by creating files in specific system folders.

Windows® Dir Lurking: A process is modifying files in the Windows® folder or its subfolders.

Services: Changes to the services keys may be related to persistence or may involve changing critical settings for services.

Encryption: A process invoked Windows® encryption Application Programming Interfaces (APIs). This is a common activity for legitimate applications, but is also very commonly used by ransomware.

Exploit: Privileges—These are examples of known exploits in the registry to run a process with admin level privileges.

User32 Hook: Process ensures a dll (dynamic link library) is loaded by all Windows® processes that load user32.

SandBox/Virtual Machine (VM) Check: A process is checking if it is running on a sandbox or a VM. There is a very small chance that the keys are being accessed for another legitimate reason.

Policy Change: A process changed a policy setting that affects the system security.

Task Scheduling: A process scheduled another process using the Windows® Task Scheduler. This behavior is a common technique used by malware in order to persist across system boots.

Internet Protocol (IP) Location Check: A process has attempted to determine details about the endpoint's geographical location based on its IP address. This behavior is commonly used by malware to customize infection based on location.

System Info Gathering: A process has attempted to gather endpoint system information. This behavior is commonly used by malware for reconnaissance of system properties and installed security updates.

Application Info Gathering: A process has attempted to gather information about applications installed on the endpoint. Malware will often use this technique in order to identify vulnerable applications and installed security products.

Emulator Check: A process is trying to determine if it is running on a Windows emulator.

Proxy Change: A process has changed the internet proxy settings. Malware will sometimes change proxy settings in order to bypass security controls.

Network Share/Universal Serial Bus (USB) Read: A process is reading from a network share or a USB drive.

Network Share/USB Write: A process is writing to a network share or a USB drive.

Distributed. Component Object Model) DCOM Server/Service: Process is installing a service/DCOM server.

Browser History Deletion: A process attempted to clear the browser cache. This technique is often used to hide browsing history and metadata.

Shadow Copy Deletion: A process attempted to delete the Volume Shadow Copy data (snapshots of the system). This technique is often used by ransomware in order to prevent backups of encrypted files from being loaded.

Volume Shadow Copy Termination: A process is attempting to stop the Windows® volume shadow copy service (VSS). This technique is often used by ransomware in order to prevent backups of files that are being encrypted.

Shadow Copy Provider Termination: A process is attempting to stop the Windows® shadow copy provider service. This technique is often used by ransomware in order to prevent backups of files that are being encrypted.

System Restore Termination: A process is attempting to stop the Windows®® system restore service. This technique is often used by ransomware in order to prevent restoration of files after they have been encrypted.

Local Domain Name Server (DNS) Resolution: A process is reading the hosts file which contains local DNS override information.

Boot Tampering: A process is attempting to change boot settings/store.

Hide File Extensions: A process is attempting to disable system wide file extension display. Often used with double extensions like (abc.png.exe) to hide the actual file type.

Disable User Access Control: A process is attempting to disable User Access Control. By disabling User Access Control, executables that are unsigned or incorrectly signed will not prompt the user for authorization to run.

Don't Show Hidden Files: A process is attempting to ensure that hidden files and folders are not viewable in Windows® Explorer®. This may be an attempt to hide files of interest.

Disable Boot Emergency Services: A process is attempting to disable boot Emergency Management Services. Emergency Management Services (EMS) provides an RS-232 accessible serial console interface to the bootloader menu on Windows.

Disable Boot Advanced. Options: A process is attempting to disable boot advanced Options. This is used to hide the advanced options menu that includes items like safe mode and debugging.

Disable Boot Recovery Options: A process is attempting to disable boot recovery options. This is used to prevent windows from booting from the last known good configuration.

Disable Boot Failure Recovery: A process is attempting to disable Windows® recovery on failures in boot. This means that every time a boot failure occurs Windows® will not attempt to mitigate it or present the user with any options.

Disable Boot Options Edit: A process is attempting to disable the changing of boot options during the boot process. Basically this disables the F10 key functionality during boot which would allow changing of other boot options.

Execution Delay: A process is being used to attempt to delay execution of other processes.

Windows® God Mode: A process is attempting to write a file into special Windows® folders that are used specifically to give complete administrator privileges and make it very hard to delete the file.

Stealthy Process Execution: A process is being launched in a manner that attempts to hide the real parent process that caused its execution.

USB Discovery: A process is looking to identify the USB devices that may be connected to the system. Malware will try to identify USB devices in order to spread laterally in an organization, or to identify files to encrypt.

Folder Discovery: A process is looking to identify details about the folders on the system. This is often used by malware to find files of interest for encryption, intellectual property theft, persistence, and the like.

Browser Tampering: A process changed a setting related to browsers. This is often done by malware for stopping data collection, modifying sites that the browser may be going to, disabling protections, and the like.

Windows® Trace Termination: A process is attempting to stop Microsoft's® network tracing. This is often done by malware to prevent analysis of its network behavior.

Process Termination: Used to terminate a running process, malware often utilize this process to ensure that they terminate one of their processes and then delete it.

Service Termination: Used to terminate a running service, malware often do this so they can attempt to either disable protections or access/modify files being used by the services.

Service Startup Disabling: Used to prevent a service from starting up. Malware often do this so they can attempt to either disable protections or access/modify files being used by the services.

Unusual Process Extension: A process running has an unusual process extension. This is often because malware downloads an executable file with a "tmp" or non-traditional executable file extension.

System Shutdown: A process has asked that the system to shutdown. May be used by malware to prevent access to the system.

WallPaper Change: A process has changed the wallpaper. Sometimes used to display ransom notes, but mostly harmless.

Disable Task Manager: The task manager was disabled. This is often done by malware to prevent a screen like a ransomware payment screen from being closed.

Safe Mode Tampering: Windows allows a system to be rebooted in Safe Mode. Malware may attempt to change the Safe Mode settings by tampering with registry keys.

Keyboard Tampering: Malware may attempt to disable or swap the behavior of certain keys to prevent certain actions from taking place.

Printer Access: Process is attempting to access the printer. Normally not suspicious but occasionally used by malware.

User Tampering: Process is attempting to change some settings of a use s). Malware may attempt to do this to gain access or hide users.

Network Info Gathering: Process is attempting to find additional shared resources or computers on the network. Malware may do this in order to determine new locations to spread to.

Prefetch Tampering: Process is attempting to modify or add files into the Windows® Prefetch folder. Normally only Windows® system files should modify this folder as this folder is used to speed up the launch of applications.

Driver Entry Tampering: Process is attempting to change registry settings related Windows® drivers.

File Downloader/Uploader: Process is used to download or upload files from the internee or other network.

Dropped Driver: Process has created a driver in the Windows driver folder. Malware may do this to install as a rootkit and maintain persistence.

Windows® Firewall Tampering: Process is being used to change the Windows® Firewall Settings. Used by malware to allow communication with C&C servers and other potentially compromised hosts.

Hiding Files: Process is being used to hide files and/or folders.

Additional Summary Events

Attention is now directed to FIGS. 6A, 6B, 6C-1, 6C-2, 6D-1, and 6D-2, which show flow diagrams detailing computer-implemented processes for determining summary events. Reference is also made to elements shown in FIGS. 1, 2, 3A, 3B-1, 3B-2, 4, 5A and 5B. The process and subprocesses of FIGS. 6A, 6B, 6C-1, and 6D-1, are computerized processes performed, for example, by the system 120'. The aforementioned processes and sub-processes can be, for example, performed manually, automatically, or a combination thereof, and, for example, in real time.

Figure 6A:
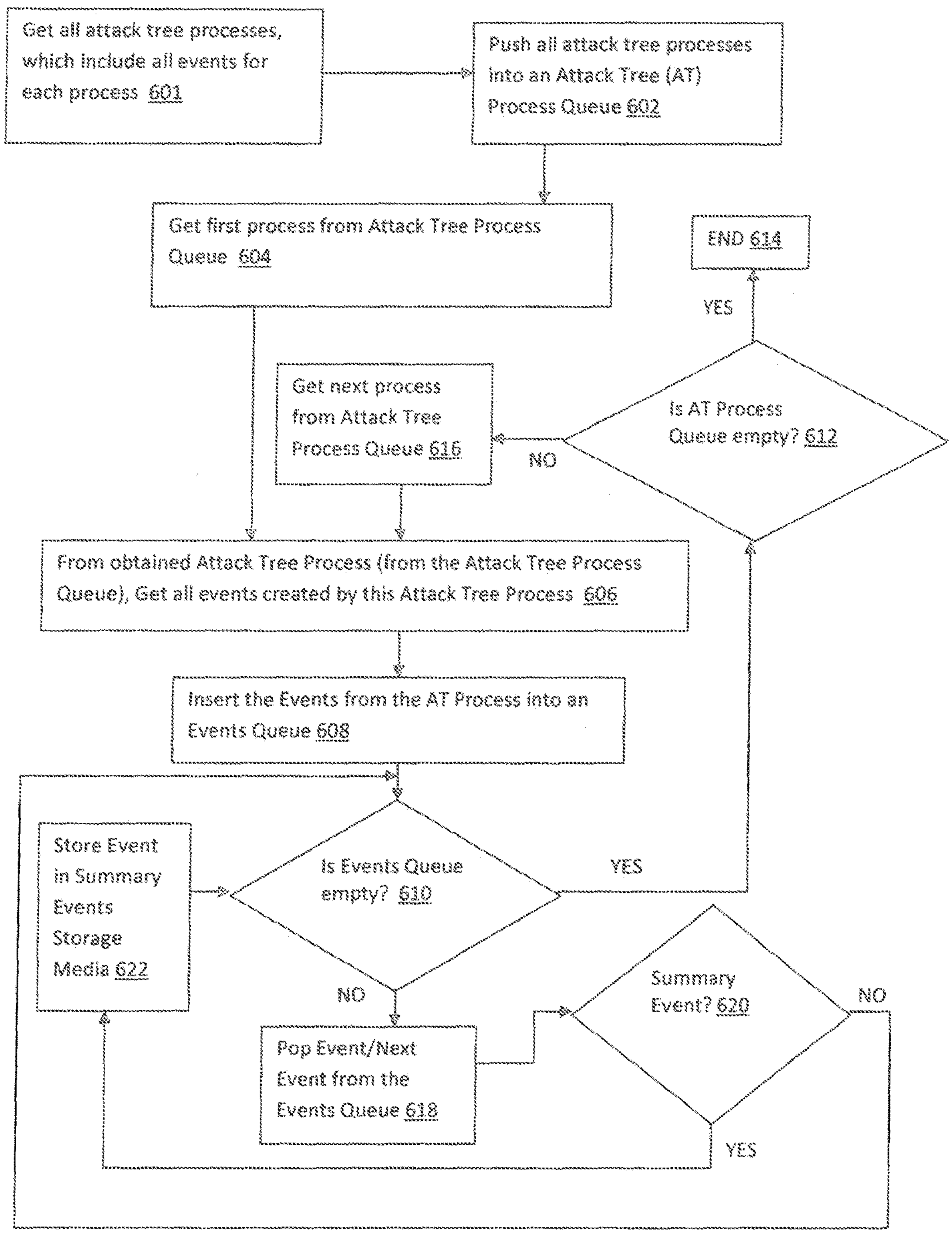
FIG. 6A is flow diagram of a process for attack tree analysis for determining summary events according to embodiments of the invention.

Turning to FIG. 6A, and initially, from FIG. 3B-2, the processes and events of the attack (known as "attack tree processes") are obtained, at block 601. The attack tree processes are pushed or transferred into a process queue, at block 602. Moving to block 604, the first attack tree process is obtained or "popped" from the queue.

The process moves to block 606, where the attack tree process which had been selected has all of its events extracted. These events are generated by forensics sensors, for example, the file, registry or network sensors. These events are also attributed to a specific process. Sensor events include, for example, file events (create/delete/modify/read/copy), network events, registry events, hooks, injections and other operations, for example, defined and/or programmed into the system by a system administrator or the like, which are tied to a process.

Moving to block 608, the extracted events, from the attack tree process, as stored in the attack tree process queue, are inserted, or otherwise pushed into an events queue. The process moves to block 610 where it is determined whether the events queue is empty. If the events queue for the attack tree process is empty, the process moves to block 612, where it is determined whether the attack tree process queue is empty. Should the attack tree process queue be empty, at block 612, the process moves to block 614, where it ends. Should the attack tree process queue not be empty at block 612, the process moves to block 616, where the next attack tree process is obtained from the attack tree process queue. From block 616, the process moves to block 606, from where it resumes, as described above.

Returning to block 610, should the events queue not be empty, the process moves to block 618, where a first or subsequent event is now popped from the events queue. The process now moves, from block 618, to block 620, where it is determined whether the event is an event of interest, where events of interest are known as "summary events". The evaluation process of block 620 for summary events is detailed in FIG. 6B in blocks 620*a*-620*g*. Should the event not be an event of interest, at block 620, the process moves to block 610. However, at block 620, should a the event be an event of interest, and therefore, a summary event, the process moves to block 622. At block 622, the summary event, or metadata representative thereof, is stored in storage media. From block 622, the process moves to block 610, from where it resumes as detailed above.

Figure 6B:
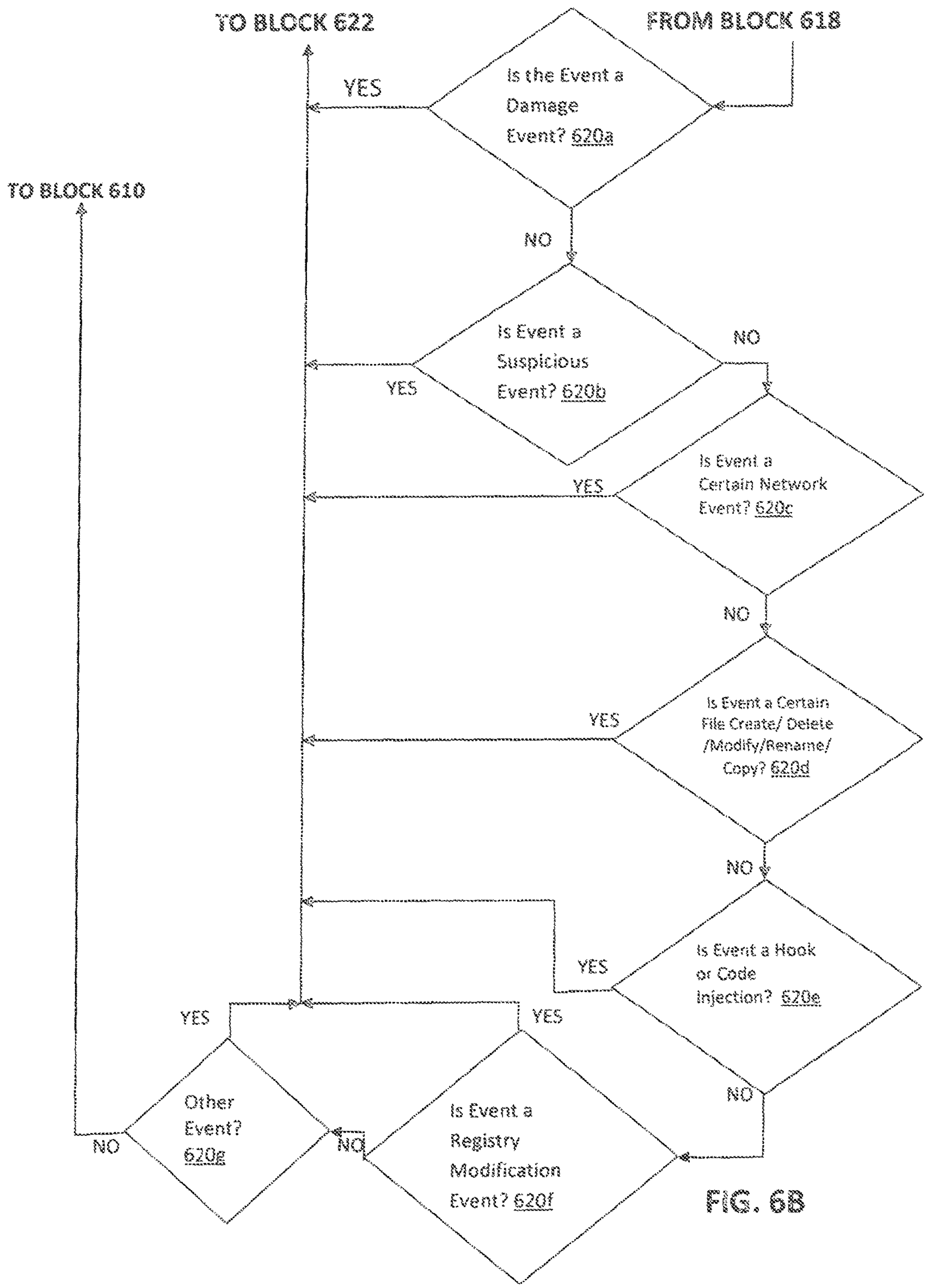
FIG. 6B is a flow diagram for determining summary events in the flow diagram of FIG. 6A.

Attention is now directed to FIG. 6B, which shows block 620 in detail, as blocks 620*a* to 620*g*. While the analysis of blocks 620*a* to 620*g* is shown in an order, this order is exemplary only, and any order of blocks 620*a* to 620*g* is permissible. From block 618, where the events queue is not empty, and thus, holds events (i.e., in the form of data), the process moves to block 620, where if an event of interest is detected, an analysis of the event, as a summary event, for this popped event is determined.

Turning to FIG. 6B, the evaluation of the event of interest as a summary event of block 620 begins at 620*a*. At block 620*a*, it is determined whether the event is a damage event. Damage Events have been defined above, in the exemplary list, but any damage event qualifies as such. Should there be a damage event detected, this damage event is a summary event, and the process moves to block 622, where the damage event is stored in storage media for summary events. From block 622, the process moves to block 610, where it is determined whether the events queue is empty. Should the events queue be empty at block 610, the process proceeds to blocks 612, and block 614, or block 616, as detailed above. Should the events queue not be empty at block 610, the next event is popped from the queue, and the analysis of this event (blocks 620*a*-620*g*) begins.

Returning to block 620*a*, should the event not be a damage event, the process moves to block 620*b*.

At block 620*b*, it is determined whether the event is a suspicious event. Suspicious events are defined above, in the exemplary list, but any suspicious event satisfies this criteria. If a suspicious event is detected at block 620*b*, a summary event is detected, and the process moves to block 622, from where the process resumes, as detailed above. If no at block 620*b*, a suspicious event was not detected, the process moves to block 620*c*.

At block 620*c*, it is determined whether the event is a certain network event, as not all network events are summary events. If yes, the process moves to block 622, and to block 610, from where the process resumes, as detailed above. If no, the process moves to block 620*d*.

Figures 1, 6C:
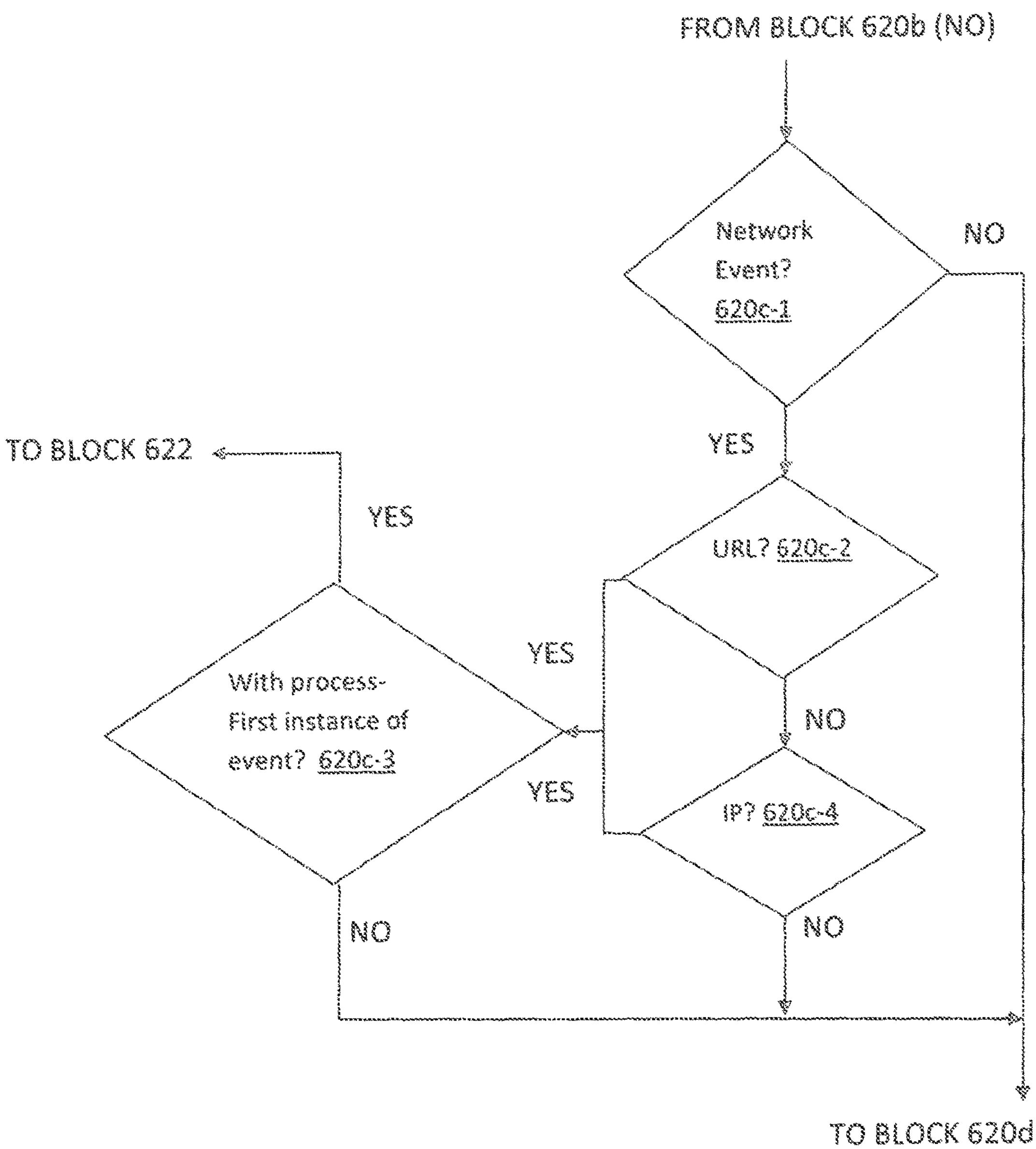

Returning to block 620*c*, the process of block 620*c* is shown in detail in the flow diagram of FIG. 6C-1, in blocks 620*c*-1 to 620*c*-4. Attention is now directed to the specific process and subprocesses of block 620*c*.

The process of block 620*c* begins at block 620*c*-1, where it is determined whether the event is a network event. A network event includes attempted communication to an IP or URL. If no at block 620*c*-1, the process moves to block 620*d*. If yes at block 620*c*-1, the process moves to block 620*c*-2, where it is determined whether there is a destination URL (Uniform Resource Locator) for the event.

At block 620*c*-2, should there be a destination URL, the process moves to block 620*c*-3. At block 620*c*-3, it is determined whether this is the first time (impression) of this destination URL. If yes at block 620*c*-3, the process moves to block 622, from where it resumes as detailed above. Returning to block 620*c*-2, if there is not a destination URL, the process moves to block 620*c*-4.

Returning to block 620*c*-3, at this block, the system determines whether this is a first instance for this destination URL. If this is a first instance for the destination URL, the process moves to block 622, from where it resumes as detailed above. If this is not a first instance for the destination URL, the process moves from block 602*e*-3 to block 620*d*.

FIG. 6C-2 shows example destination URLs used in determining whether the destination URLs are a first instance thereof, as per block 620*c*-3. Initially, there are four destination. URLs, which have been reached at time t, the earliest time, to time t+3, the latest time.

Looking at time t at the first destination URL, CNN.com, the subevent is an HTTP POST. Here, this is the first time an HTTP POST subevent has occurred with the URL CNN-.com, so this particular subevent for the URL CNN.com is a summary event. Looking at the next URL, at the next (subsequent) time t+1, which is CNN.com, the subevent is an HTTP GET. Again, this is the first occurrence of this particular subevent with the URL CNN.com, so it is a summary event. At time t+2, a third UTL, CNN.com is seen, with an HTTP POST subevent. As this combination has been seen previously, this is not a summary event. Finally, at the next time, the URL ABC.com is seen with the subevent HTTP GET. As this combination is now seen for the first time, it is a summary event.

Returning to block 620*c*-4, it is determined whether there is a destination IP (Internet Protocol) for the event.

At block 620*c*-4, should there be a destination IP, the process moves to block 620*c*-3. At block 620*c*-3, it is determined whether this is the first instance of this destination IP. If yes, the process moves to block 622, from where it resumes as detailed above. Returning to block 620*c*-2, should there not be a destination IP, the process moves to block 620*d*.

At block 620*c*-3, it is determined whether this is a first instance for this destination IP. If this is a first instance for the destination IP, the process moves to block 622, from where it resumes as detailed above. If this is not a first instance for the destination IP, the process moves to block 620*d*.

FIG. 6C-2 shows example destination IPs used in determining whether the destination IPs are a first impression thereof, as per block 620*c*-3. Initially, there are three destination IPs, which have been reached at time t, the earliest time, to time t+2, the latest time.

Looking at time t, a first time, for IP 121.9.8.8, the subevent is a SEND. Here, this is the first time a SEND subevent has occurred, so this particular SEND subevent for IP 121.9.8.8 is a summary event. Looking at the next subevent at time t+1 for IP 121.9.8.8, there is a RECEIVE (RCV) subevent. As this is a first occurrence of the RECEIVE subevent, this is also a summary event. Moving to the third instance for the IP 121.9.8.8, at time t+2, the associated subevent is a SEND. As a SEND subevent has been previously detected for this IP 121.9.8.8, this is second or subsequent occurrence, and is not a summary event.

Absent a first impression at block 620*c*-3 or there is not a destination IP at block 620*c*-4, a certain network event has not been detected (in block 620*c*). The process moves to block 620*d*, where the event is analyzed to determine whether it is a create/modify/delete/rename/copy.

At block 620*d*, it is determined whether the event is a create/delete/modify/rename/copy event. If yes, the process moves to block 622, and to block 610, from where the process resumes, as detailed above. Should the event queue not be empty at block 610, the next event is popped from the queue, and the analysis of this event (blocks 620*a*-620*g*) begins. If no at block 620*d*, the process moves to block 620*e*.

Figures 1, 6D:
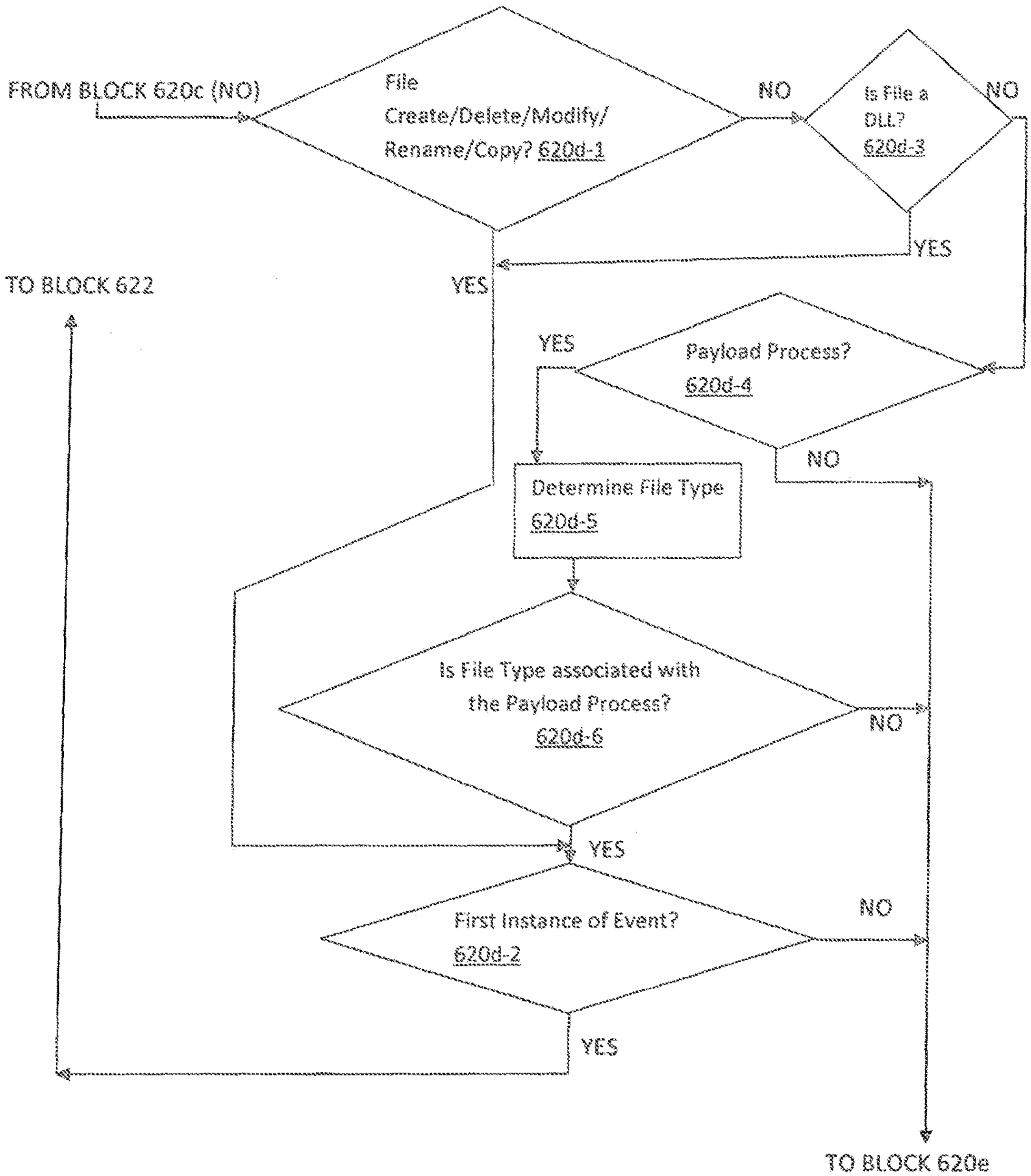

The process of block 620*d* is shown in detail in the flow diagram of FIG. 6D-1, as blocks 620*d*-1 to 620*d*-6, to which attention is now directed.

The process of block 620*d* begins at block 620*d*-1, where it is determined whether the event is a file Create/Delete/Modify/Rename/Copy. If yes, the process moves to block 620*d*-2, where it is determined whether this is a first instance of the event, as discussed below. If, at block 620*d*-1, the event is not a file Create/Delete/Modify/Rename/Copy, the process moves to block 620*d*-3, where it is determined if the file is a DLL (Dynamic Link Library).

If the file is a dll at block 602*d*-3, this means that the file is read (now a read event) or mapped to a destination, the process moves to block 620*d*-2, where it is determined whether this is a first instance of the event, as discussed below. If no at block 620*d*-3, the process moves to block 620*d*-4.

At block 620*d*-4, it is determined whether the file (as "popped" from the attack tree queue) is a payload process, where the process has an attached file type that it opens. If the file is not a payload process at block 620*d*-4, the process moves to block 620*e*. Should the file be a payload process at block 620*d*-4, the process moves to block 620*d*-5, where the file type is determined.

From block 620*d*-5, with the file type of the payload process determined, the process moves to block 620*d*-6, where it is determined whether the file type determined (in block 620*d*-5) is associated with the payload process. For example, a .doc file is associated with a WORD document, a .bat file is associated with batch processing, and an .xll file is associated with an excell document. If no, at block 620*d*-6, the process moves to block 620*e* (from where it resumes as detailed below). If yes at block 620*d*-6, the process moves to block 620*d*-2, where it is determined whether this is the first instance of the event.

At block 620*d*-2, should there be a first instance of the event, the process moves to block 622, from where it resumes, as detailed above. Should there not be a first instance of the event, the process moves to block 620*e*.

FIG. 6D-2 shows six example events and corresponding pathways, at times t (earliest) to t+5 (latest), used in determining whether the event is a first instance thereof, as per block 620*d*-2. A first instance of the event, as determined at block 620*d*-2, is classified as a summary event, when there is a first appearance of an event and its corresponding path.

For example, the first event, at time t, is a CREATE (C) with a path C:\LOL.TXT. This is a summary event, as it is the first instance of the paired event and its associated path. Next, at time t+1, there is a MODIFY (M) event with a path C:\LOL:TXT. As this pair is appearing for the first time, it is also a summary event. At time t+2, another MODIFY (M) event with the path C:\LOL.TXT appears. This is a subsequent occurrence of this pair, so this MODIFY event at t+2 is not a summary event. Similarly, at time t+3, another MODIFY (M) event with the path C:\LOL.TXT appeals. This is a subsequent occurrence of this pair, so it is not a summary event. At time t+4, the event is a DELETE (D) and the path is C:\LOL.TXT, which is the first occurrence of this pair, rendering it as a summary event. Next, at time t+5, a CREATE (C) event has the path C:\S.TXT, this path being a first instance thereof. Accordingly, this is a summary event.

Should a summary event not have been detected in block 620*d*, by the process of blocks 620*d*-1 to 620*d*-6, the process moves to block 620*e*.

At block 620*e*, it is determined whether the event is a hook or code injection. Hook or code injections have been defined above as process is attempting to inject into other processes in order to influence their execution, but any hook or code injection qualifies as such. Should there be a hook or code injection detected, this hook or code injection is a summary event, and the process moves to block 622, where the hook or code injection is stored in storage media for summary events (and the process resumes from block 622 as detailed above). Should a hook or code injection not be determined, the process moves to block 620*f*.

At block 620*f*, it is determined whether the event is a registry modification (registry modify). Registry modifies have been defined above, and include, for example, malicious attempts to change registry values, registry keys and the like, but any registry modify qualifies as such. Should there be a registry modify detected, this registry modify is a summary event, and the process moves to block 622, where the registry modify is stored in storage media for summary events (and the process resumes from block 622 as detailed above). At block 620*f*, should the event not be a registry modify, the process moves to block 620*g*.

At block 620*g*, it is determined if the event is a summary event, based on, for example, a matching or other correlation of preprogrammed characteristics, rules and policies or the like. This is because the system operates cumulatively, and over time, certain events, which initially were not summary events, are now identified as summary events. At block 620*g*, should the event being analyzed not be a summary event, the process moves to block 610, from where the process resumes, as detailed above. However, should there be a match or correlation, whereby the event is a summary event, the process moves to block 622, where the registry modify is stored in storage media for summary events. From block 622, the process moves to block 610, where the process resumes, as detailed above.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided, as well. A display and/or a user input device such as a keyboard or mouse are optionally provided as well.

For example, any combination of one or more non-transitory computer readable (storage) medium(s) may be utilized in accordance with the above-listed embodiments of the present invention. The non-transitory computer readable (storage) medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

As will be understood with reference to the paragraphs and the referenced drawings, provided above, various embodiments of computer-implemented methods are provided herein, some of which can be performed by various embodiments of apparatuses and systems described herein and some of which can be performed according to instructions stored in non-transitory computer-readable storage media described herein. Still, some embodiments of computer-implemented methods provided herein can be performed by other apparatuses or systems and can be performed according to instructions stored in computer-readable storage media other than that described herein, as will become apparent to those having skill in the art with reference to the embodiments described herein. Any reference to systems and computer-readable storage media with respect to the following computer-implemented methods is provided for explanatory purposes, and is not intended to limit any of such systems and any of such non-transitory computer-readable storage media with regard to embodiments of computer-implemented methods described above. Likewise, any reference to the following computer-implemented methods with respect to systems and computer-readable storage media is provided for explanatory purposes, and is not intended to limit any of such computer-implemented methods disclosed herein.

The flowcharts and block diagrams in the Figures illustrate the architecture, functionality, and operation of possible implementations of systems, methods and computer program products according to various embodiments of the present invention. In this regard, each blocks in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements, The above-described processes including portions thereof can be performed by software, hardware and combinations thereof. These processes and portions thereof can be performed by computers, computer-type devices, workstations, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A method of using a particular computer to isolate certain events indicative of an attack on a computerized end point, comprising:

using the particular computer to generate an attack tree corresponding to an attack on a computerized end point, the attack tree comprising events based on processes performed by the computerized end point associated with the attack;

using the particular computer to analyze the events of the attack tree by:

a) isolating primary events, from the events of the attack tree, associated with the attack on the computerized end point, including events of the attack tree:

1) where at least one of data, applications, and credentials, associated with the computerized end point, are at least one of maliciously: manipulated, altered or compromised; or, 2) indicative of abnormal process behavior or known behaviors common to malicious activity;

b) wherein each isolated primary event is unique from every other isolated primary event;

c) isolating secondary events, from the remaining events of the attack tree, associated with the attack on the computerized end point including at least one of: network events, file create/delete/modify/rename/copy events, registry modification events, predefined events associated with potential malicious behaviors of interest, and, hook and code injections; and, d) wherein each isolated secondary event is unique from every other isolated primary event and every other isolated secondary event; and, using the particular computer to provide a description of the attack on the computerized end point by selectively using the unique isolated primary and unique isolated secondary events.

2. The method of claim 1, wherein the primary events include at least one of damage and suspicious events.

3. The method of claim 1, wherein the network events include first instances of at least one of a destination Uniform Resource Locator (URL) and Internet Protocol (IP).

4. The method of claim 1, wherein the File Create/Delete/Modify/Rename/Copy events include a first instance of at least one of: a File Create/Delete/Modify/Rename/Copy event, a digital link library (DLL) file, and, a file associated with a payload process.

5. The method of claim 1, wherein the computerized end point includes at least one of a machine, including a computer, and, a node of a network or system.

6. A computer usable non-transitory storage medium having a computer program embodied thereon for causing a suitably programmed system to isolate certain events indicative of an attack on a computerized end point, by performing the following steps when such program is executed on the system, the steps comprising:

obtaining an attack tree corresponding to an attack on a computerized end point, the attack tree comprising events based on processes performed by the computerized end point associated with the attack;

analyzing the events of the attack tree by:

a) isolating primary events, from the events of the attack tree, associated with the attack on the computerized end point, including events of the attack tree:

1) where at least one of data, applications, and credentials, associated with the computerized end point, are at least one of maliciously: manipulated, altered or compromised; or, 2) indicative of abnormal process behavior or known behaviors common to malicious activity;

b) wherein each isolated primary event is unique from every other isolated primary event;

c) isolating secondary events, from the remaining events of the attack tree, associated with the attack on the computerized end point including at least one of: network events, file create/delete/modify/rename/copy events, registry modification events, predefined events associated with potential malicious behaviors of interest, and, hook and code injections; and, d) wherein each isolated secondary event is unique from every other isolated primary event and every other isolated secondary event; and, providing a description of the attack on the computerized end point by selectively using the unique isolated primary and unique isolated secondary events.

7. The computer usable non-transitory storage medium of claim 6, wherein the primary events include at least one of damage and suspicious events.

8. The computer usable non-transitory storage medium of claim 6, wherein the network events include first instances of at least one of a destination Uniform Resource Locator (URL) and Internet Protocol (IP).

9. The computer usable non-transitory storage medium of claim 6, wherein the File Create/Delete/Modify/Rename/Copy events include a first instance of at least one of: a File Create/Delete/Modify/Rename/Copy event, a digital link library (DLL) file, and, a file associated with a payload process.

10. The computer usable non-transitory storage medium of claim 6, wherein the computerized end point includes at least one of a machine, including a computer, and a node of a network or system.

11. A computer system for isolating certain events indicative of an attack on a computerized end point, comprising:

a non-transitory storage medium for storing computer components; and, a computerized processor for executing the computer components comprising:

a module for obtaining an attack tree corresponding to an attack on a computerized end point, the attack tree comprising events based on processes performed by the computerized end point associated with the attack;

a module for analyzing the events of the attack tree by:

a) isolating primary events, from the events of the attack tree, associated with the attack on the computerized end point, including events of the attack tree:

1) where at least one of data, applications, and credentials, associated with the computerized end point, are at least one of maliciously: manipulated, altered or compromised; or, 2) indicative of abnormal process behavior or known behaviors common to malicious activity;

b) wherein each isolated primary event is unique from every other isolated primary event;

c) isolating secondary events, from the remaining events of the attack tree, associated with the attack on the computerized end point including at least one of: network events, file create/delete/modify/rename/copy events, registry modification events, predefined events associated with potential malicious behaviors of interest, and, hook and code injections; and, d) wherein each isolated secondary event is unique from every other isolated primary event and every other isolated secondary event; and, a module for providing a description of the attack on the computerized end point by selectively using the unique isolated primary and unique isolated secondary events.

12. The computer system of claim 11, wherein the primary events include at least one of damage and suspicious events.

13. The computer system of claim 11, wherein the network events include first impressions of at least one of a destination Uniform Resource Locator (URL) and Internet Protocol (IP).

14. The computer system of claim 11, wherein the file create/delete/modify/rename/copy events include a first instance of at least one of: a file create/delete/modify/rename/copy event, a digital link library (DLL) file, and, a file associated with a payload process.

15. The computer system of claim 11, wherein the computerized end point includes at least one of a machine, including a computer, and, a node of a network or system.

* * * * *